US005666949A

United States Patent [19]

Debe et al.

[11] Patent Number: 5,666,949

[45] Date of Patent: Sep. 16, 1997

[54] EXPOSURE INDICATOR WITH CONTINUOUS ALARM SIGNAL INDICATING MULTIPLE CONDITIONS

[75] Inventors: Mark K. Debe, Stillwater; Lowell R. Miller, White Bear Lake; Edward E. Parsonage, Minneapolis; Richard J. Poirier, White Bear Lake, all of Minn.; Gregory Yuschak, Hudson, Wis.

[73] Assignee: Minnesota Mining and Manufacturing Company, St. Paul, Minn.

[21] Appl. No.: 328,106

[22] Filed: Oct. 24, 1994

[51] Int. Cl.[6] .............................. A62B 9/04; A62B 7/00; A62B 18/08; B01D 19/00

[52] U.S. Cl. .............................. 128/202.22; 128/202.27; 128/205.23; 128/206.17; 128/206.21; 128/201.25; 128/205.22; 55/274; 116/206; 374/162

[58] Field of Search .............................. 116/200–202, 206, 116/207, 214, 149, DIG. 17, DIG. 25; 374/162; 128/202.22, 205.23, 205.27, 206.12, 206.16, 206.17, 202.27, 201.25, 206.21; 340/632; 55/274

[56] References Cited

U.S. PATENT DOCUMENTS

| | | | |
|---|---|---|---|
| 3,902,485 | 9/1975 | Wallace | 128/142 |
| 3,911,413 | 10/1975 | Wallace | 340/237 |
| 3,953,556 | 4/1976 | Gore | 264/288 |
| 4,146,887 | 3/1979 | Magnante | 340/632 |

(List continued on next page.)

FOREIGN PATENT DOCUMENTS

| | | |
|---|---|---|
| 645959 | 1/1994 | Australia . |
| 0 447 619 A1 | 9/1991 | European Pat. Off. . |
| 39 14 664 A1 | 11/1990 | Germany . |
| 94 07 866.1 | 8/1994 | Germany . |

OTHER PUBLICATIONS

R.V. Arenas et al., "Portable, Multigas monitors for Air Quality Evaluation Part II: Survey of Current Models", *American Laboratory*, Jul. 1993, pp. 25–31.

E.S. Moyer et al., "Preliminary Evaluation of an Active End–of–Service–Life Indicator for Organic Vapor Cartridge Respirators", *Am. Ind. Hyg. Assoc. J.*, 54(8), Aug. 1993, pp. 417–426.

(List continued on next page.)

*Primary Examiner*—Kimberly L. Asher

*Attorney, Agent, or Firm*—Gary L. Griswold; Walter N. Kirn; James A. Rogers

[57] ABSTRACT

An exposure indicating apparatus and indicating method includes a sensor having a property responsive to a concentration of a target species. A processing device generates a concentration signal as a function of the property and an indicator is activated as a function of the concentration signal. The indicator is activated at a signaling rate indicative of an exposure indicating apparatus operating within predefined design parameters and at an exposure signaling rate indicative of the concentration attaining a predetermined threshold concentration. The indicator may also be activated at a signaling rate indicative of an exposure indicating apparatus operating outside of the predefined design parameters, and after the predetermined threshold concentration is attained, the indicator may be activated at an exposure signaling rate which varies as a function of the concentration signal.

19 Claims, 13 Drawing Sheets

U.S. PATENT DOCUMENTS

| | | | |
|---|---|---|---|
| 4,390,869 | 6/1983 | Christen et al. | 340/632 |
| 4,440,162 | 4/1984 | Sewell et al. | 128/202.22 |
| 4,539,256 | 9/1985 | Shipman | 428/315.5 |
| 4,669,415 | 6/1987 | Boord | 116/75 |
| 4,726,989 | 2/1988 | Mrozinski | 428/315.5 |
| 4,812,352 | 3/1989 | Debe | 428/142 |
| 4,847,594 | 7/1989 | Stetter | 340/540 |
| 4,873,970 | 10/1989 | Freidank et al. | 128/202 |
| 5,018,518 | 5/1991 | Hübner | 128/202 |
| 5,039,561 | 8/1991 | Debe | 427/255 |
| 5,238,729 | 8/1993 | Debe | 428/245 |
| 5,280,273 | 1/1994 | Goldstein | 340/632 |
| 5,297,544 | 3/1994 | May et al. | 128/202 |
| 5,303,701 | 4/1994 | Heins et al. | 128/206 |
| 5,336,558 | 8/1994 | Debe | 428/323 |
| 5,338,430 | 8/1994 | Parsonage et al. | 204/412 |
| 5,413,097 | 5/1995 | Birenheide et al. | 128/206.17 |

OTHER PUBLICATIONS

G.J. Maclay et al., "A Prototype Active End–of–Service–Life Indicator for Respirator Cartridges", *Appl. Occup. Environ. Hyg.*, 6(8) Aug. 1991 pp. 677–682.

CEA Instruments, Inc., "Personal Gas Detector" (product literature) Jan. 1994, Emerson, NJ.

Spectrex Corporation, "Color–Bar, VOC Gas Sensor Model C–10" (product literature), Redwood City, CA.

MSA, "Cricket Personal Alarms (80–00–14)" (product literature), 1994, 08–00–14, 2pp.

Enmet Corporation, "Toximet Series $O_2$ –CO –$H_2S$ –NO –$H_2$ –$NO_2$ –HC1 –HCN –$SO_2$ –C1 –$NH_3$" (product literature), PDG–2200–Apr. 1993, Ann Arbor, MI 48106, 2pp.

Texas Instruments, "TLC251C, TLC251AC, TLC251BC, TLC251Y Programmable Low–Power LinCMOS Operational Amplifiers", Nov. 1991 (product literature) 3pp.

Federal Register, vol. 49, No. 140, Jul. 19, 1964, pp. 29270–29272.

EXPOSURE INDICATOR WITH CONTINUOUS ALARM SIGNAL INDICATING MULTIPLE CONDITIONS

FIELD OF THE INVENTION

The present invention relates to an exposure indicator which signals the concentration of a target species.

BACKGROUND OF THE INVENTION

A variety of respirator systems exist to protect users from exposure to dangerous chemicals. Examples of these systems include negative pressure or powered air respirators which use a cartridge containing a sorbent material for removing harmful substances from the ambient air, and supplied air respirators.

A number of protocols have been developed to evaluate the air being delivered to the user. These protocols may also be used to determine whether the sorbent material is near depletion. The protocols include sensory warning, administrative control, passive indicators, and active indicators.

Sensory warning depends on the user's response to warning properties. The warning properties include odor, taste, eye irritation, respiratory tract irritation, etc. However, these properties do not apply to all target species of interest and the response to a particular target species varies between individuals. For example, methylbromide, commonly found in the manufacturing of rubber products, is odorless and tasteless.

Administrative control relies on tracking the exposure of the respirator sorbent to contaminants, and estimating the depletion time for the sorbent material. Passive indicators typically include chemically coated paper strips which change color when the sorbent material is near depletion. Passive indicators require active monitoring by the user.

Active indicators include a sensor which monitors the level of contaminants and an indicator to provide an automatic warning to the user.

One type of active indicator is an exposure monitor, which is a relatively high cost device that may monitor concentrations of one or more gases, store and display peak concentration levels, function as a dosimeter through the calculation of time weighted averages, and detect when threshold limit values, such as short term exposure limits and ceiling limits, have been exceeded. However, the size and cost of these devices make them impractical for use as an end-of-life indicator for an air purifying respirator cartridge.

A second type of active indicator which has been disclosed includes a sensor either embedded in the sorbent material or in the air stream of the face mask connected to an audible or visual signaling device. The cartridge containing the sorbent material is replaced when the sensor detects the presence of a predetermined concentration of target species in the sorbent material or the face mask.

Some personal exposure indicators include threshold devices that actuate a visual or audible alarm when a certain threshold level or levels have been reached. In addition, some active indicators also provide a test function for indicating that the active indicator is in a state of readiness, e.g., the batteries of the indicator are properly functioning.

However, active indicators utilizing only one or two thresholds to activate alarms have constant characteristics after the alarm activation. These indicators provide no indication of the rate of change of target species above the threshold level, nor any sense of how long the user has to reach a safer environment or replace a respirator cartridge.

Such constant characteristics are particularly disadvantageous because saturation of a respirator cartridge after attaining the threshold level can change rapidly due to a wide variety of factors, including temperature, humidity, and the nature of the target species. The lack of knowledge of the rate of concentration change could be a concern.

As shown in some devices, separate systems for indicating that the active indicator is in a state of readiness or that the active indicator is functioning correctly, have several disadvantages. In practical use, the user may forget, be unable to take the time, or not have hands available to press buttons or activate switches to verify the proper functioning of the indicator and/or the battery. Use of separate indicator systems for hazard alarm and readiness may also lead to a false sense of security, in that the separate hazard alarm could malfunction and the readiness alarm could still indicate that the active indicator is ready for use.

Additionally, if these systems use irreversible sensors, in which the property of the sensing device that indicates the presence of the target species is permanently changed upon exposure, once the sensing device is saturated, it must be replaced. Consequently, irreversible sensors if mounted in the sorbent material or the face mask must be shielded to prevent exposure to target species in the ambient air that are not drawn directly through the sorbent material. If the sensor is inadvertently exposed to the toxic environment, such as by a momentary interruption in the face seal of the respirator or during replacement, the sensor can become saturated and unusable.

For some applications, it is useful to identify decreasing concentrations of a target species, such as oxygen. Irreversible sensors typically are incapable of detecting decreasing concentrations of a target species.

Some disclosed indicators locate the sensor within the air flow path of the face mask so that it is not possible to detach the sensor or the signaling device without interrupting the flow of purified air to the face mask. In the event that the sensor and/or signaling device malfunction or becomes contaminated, the user would need to leave the area containing the target species in order to check the operation of the respirator.

SUMMARY OF THE INVENTION

The present invention is directed to an exposure indicating apparatus for overcoming some known disadvantages. The present invention utilizes a variable frequency alarm signal protocol to enhance the information provided to the user about the status of the user's environment, including the concentration of a target species. Such enhanced information is provided with no action required by the user and is intended to provide optimized safety and security to the user.

The exposure indicating apparatus includes a sensor having at least one property responsive to a concentration of a target species within an environment. A processing device generates a concentration signal as a function of the at least one property. An exposure signaling rate of an indicator varies as a function of the concentration signal.

In another embodiment of the invention, the processing device includes a threshold detector for generating a threshold signal in response to the concentration signal when a predetermined threshold concentration is attained. The indicator is then activated in response to the threshold signal at a threshold exposure signaling rate corresponding to the predetermined threshold concentration. The exposure signaling rate may then vary thereafter as a function of the concentration signal.

In another embodiment, the processing device drives the indicator at a ready signaling rate indicative of an exposure indicating apparatus operating within predefined design parameters. The processing device further drives the indicator at a fault signaling rate different from the ready signaling rate indicative of the exposure indicating apparatus operating outside of the predefined design parameters. In the preferred embodiment, the indicator operates at a signaling rate in the frequency range of 0.001 to 30 Hz.

In still another embodiment, the exposure indicating apparatus includes a sensor having at least one property responsive to a concentration of a target species within an environment and a processing device to generate a concentration signal as a function of the at least one property. The processing device further includes a single signal indicator driven at a first signaling rate indicative of an exposure indicating apparatus operating within predefined design parameters, at a second signaling rate discernible from the first signaling rate indicative of an exposure indicating apparatus operating outside of the predefined design parameters, and at an exposure signaling rate indicative of the concentration attaining a predetermined threshold concentration. After the predetermined threshold concentration is attained, the indicator may be driven at an exposure signaling rate which varies as a function of the concentration signal or an exposure signaling rate corresponding to a plurality of predetermined threshold concentrations.

In further embodiments of the invention, the indicator of the apparatus may be a visual indicator, an audible indicator, a vibro-tactile indicator, or some combination of these indicators responding to a common concentration signal. Further, the sensor may be positioned in fluid communication with a flow-through path on a respirator, the exposure indicating apparatus may be releasably attached to a respirator, or the exposure indicating apparatus may be constructed for use as a personal exposure indicator or an environmental indicator.

The sensor may be an electrochemical sensor or some other sensor. The sensor may be reversible or irreversible. Furthermore, the target species being sensed may be a toxic gas, such as hydrogen sulfide or carbon monoxide, or a gas that has the characteristics of a toxic or explosive gas. Alternatively, the sensor may sense the presence or absence of oxygen. The at least one property of the sensor may include temperature, mass, size or volume, complex electric permittivity such as AC impedance and dielectric, complex optical constants, magnetic permeability, bulk or surface electrical resistivity, electrochemical potential or current, optical emissions such as fluorescence or phosphorescence, electric surface potential, and bulk modulus of elasticity.

A method of the present invention for indicating exposure of a user to a target species within an environment senses a concentration of the target species and generates a concentration signal as a function of the concentration. An indicator is activated at an exposure signaling rate which varies as a function of the concentration signal.

A further method of the present invention utilized with an exposure indicating apparatus for indicating exposure of a user to a target species within an environment includes sensing a concentration of the target species and generating a concentration signal as a function of the concentration. A single signal indicator is operated as a function of the concentration signal with the indicator being operated at a first signaling rate indicative of the exposure indicating apparatus operating within predefined design parameters, at a second signaling rate discernible from the first signaling rate indicative of an exposure indicating apparatus operating outside of the predefined design parameters, and at an exposure signaling rate indicative of the concentration attaining a predetermined threshold concentration. The indicator may further be operated, after the predetermined threshold concentration is attained, at an exposure signaling rate which varies as a function of the concentration signal or at a plurality of exposure signaling rates corresponding to a plurality of predetermined threshold concentrations.

Definitions as used in this application:

"Ambient air" means environmental air;

"Concentration signal" means a signal generated by the processing device in response to at least one property of the sensor;

"Exposure signaling rate" means a rate or pattern at which the indicator is activated in response to the concentration signal;

"External Environment" means ambient air external to the respirator;

"Face Mask" means a component common to most respirator devices, including without limit negative pressure respirators, powered air respirators, supplied air respirators, or a self-contained breathing apparatus;

"Fault signaling rate" means any rate or pattern distinct from the other signaling rates at which the indicator is activated to signal an actual or potential malfunction in the exposure indicator;

"Flow-through path" means all channels within, or connected to, the respirator through which air flows, including the exhaust port(s);

"Ready signaling rate" means any rate or pattern at which the signal indicator is operated to signal that the exposure indicator is operating within design parameters;

"Single Signal Indicator" means any number of visual, audible, or tactile indicators responding to a single concentration signal, with a common signaling rate;

"Target Species" means a chemical of interest in gaseous, vaporized, or particulate form;

"Threshold signaling rate" means any rate or pattern distinct from the other rates at which the indicator is operated to signal that the concentration signal has reached a predetermined level.

DETAILED DESCRIPTION OF THE PREFERRED EMBODIMENTS

Figure 1:
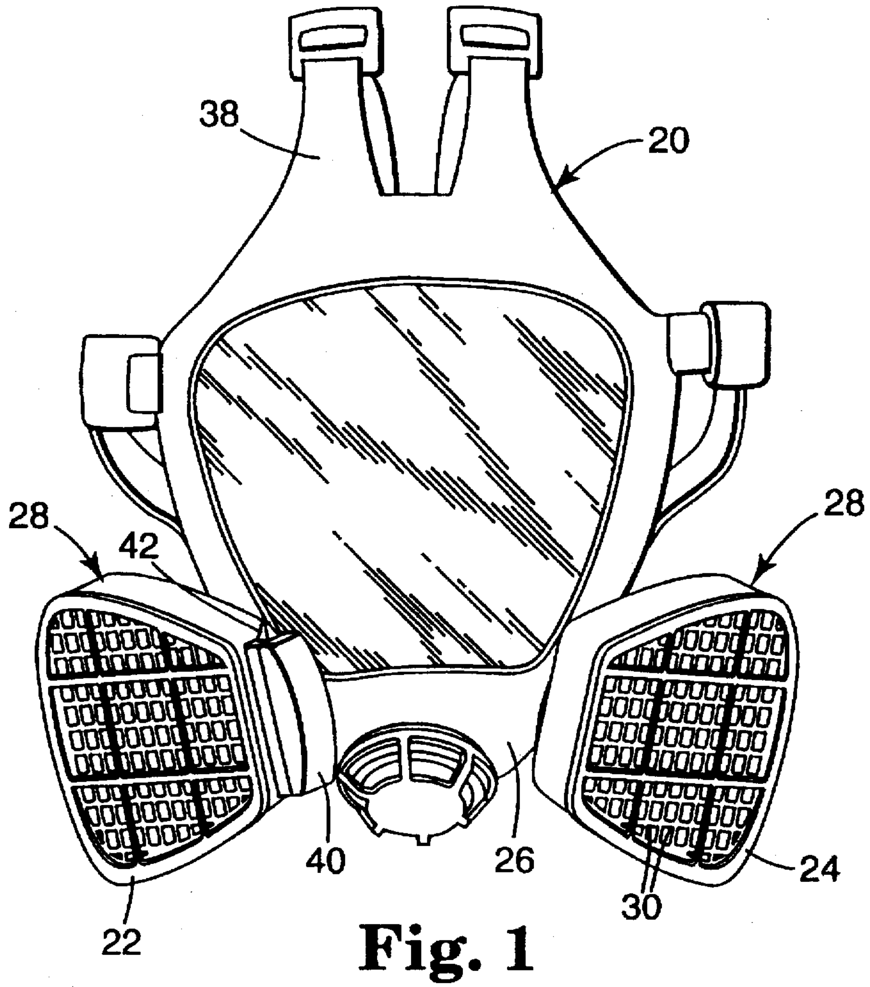
FIG. 1 illustrates an exemplary respirator with an exposure indicator releasably attached to a respirator cartridge.
Figure 1A:
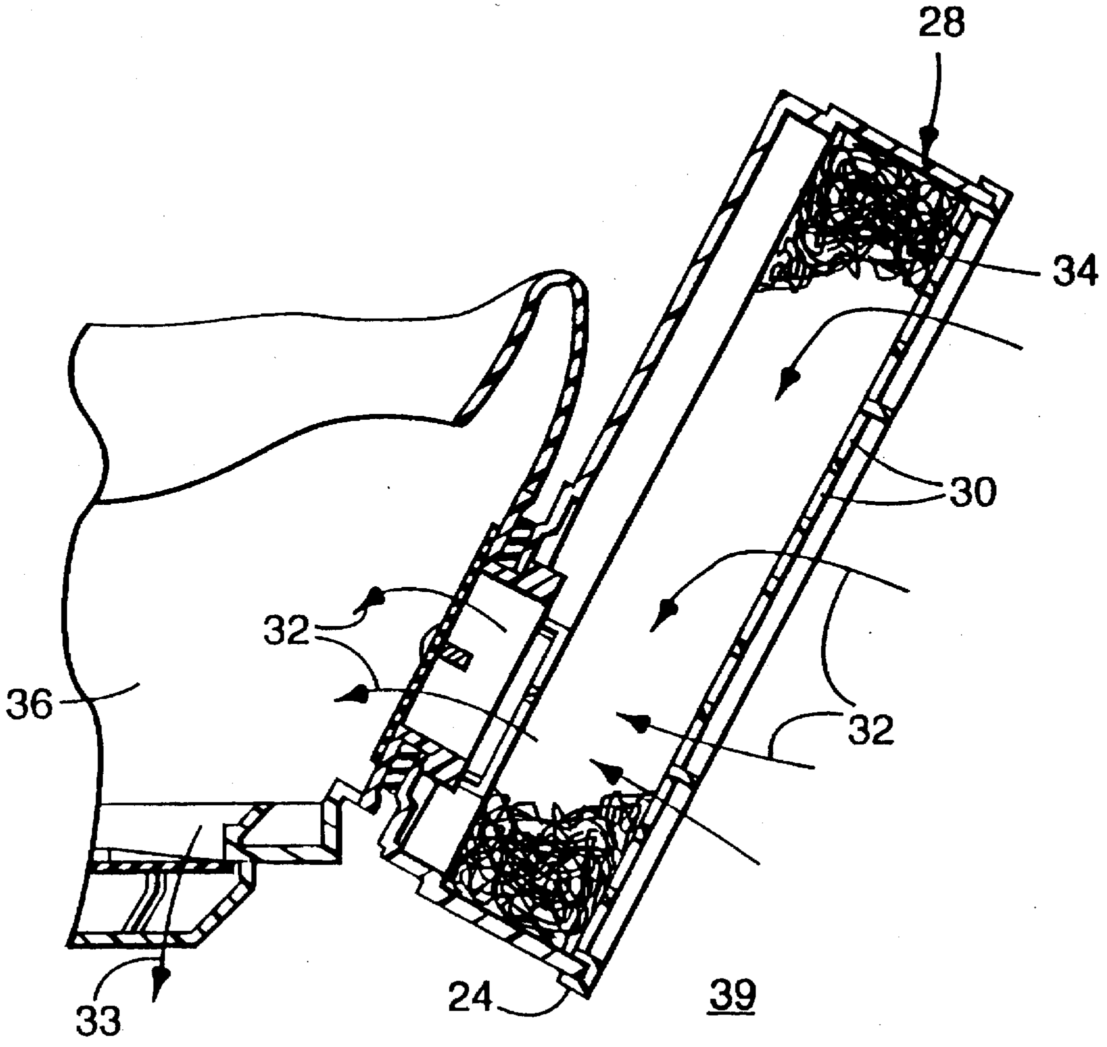
FIG. 1A is a sectional view of FIG. 1.

FIGS. 1 and 1A illustrate an exemplary respirator system 20 containing a pair of air purifying respirator cartridges 22, 24 disposed laterally from a face mask 26. Outer surfaces 28 of the cartridges 22, 24 contain a plurality of openings 30 which permit ambient air from the external environment 39 to flow along a flow-through path 32 extending through a sorbent material 34 in the cartridges 24 and into a face mask chamber 36. It will be understood that cartridge 22 is preferably the same as cartridge 24. The flow-through path 32 also includes an exhaust path 33 that permits air exhaled by the user to be exhausted into the external environment 39.

The air purifying respirator cartridges 22, 24 contains a sorbent material 34 which absorbs target species in the ambient air to provide fresh, breathable air to the user. A sorbent material 34 may be selected based on the target species and other design criteria, which are known in the art.

An exposure indicating apparatus 40 is releasably attached to the cartridge housing 22 so that air can be monitored as it flows along the flow-through path 32 downstream of at least a portion of the sorbent material 34. Indicators 42 are located on the exposure indicating apparatus 40 so that they are visible when attached to the respirator system 20 being worn by a user. It will be understood that an exposure indicator may be attached to either or both of the cartridge housings 22, 24. The respirator system 20 preferably includes an attaching device 38 for retaining the face mask 26 to the face of the user.

Figure 10:
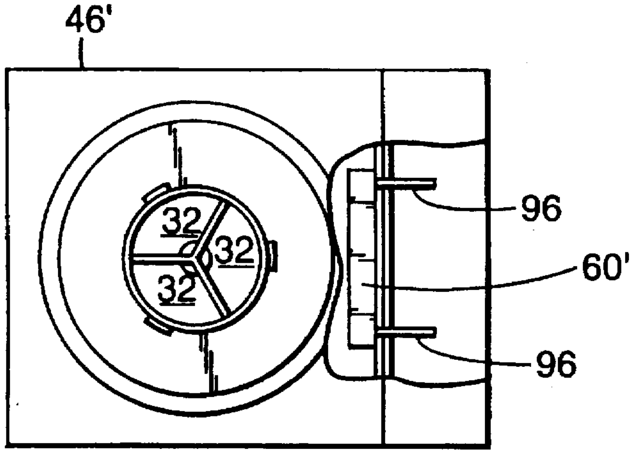
FIG. 10 is a sectional view of the flow-through housing of FIG. 6.
Figure 2:
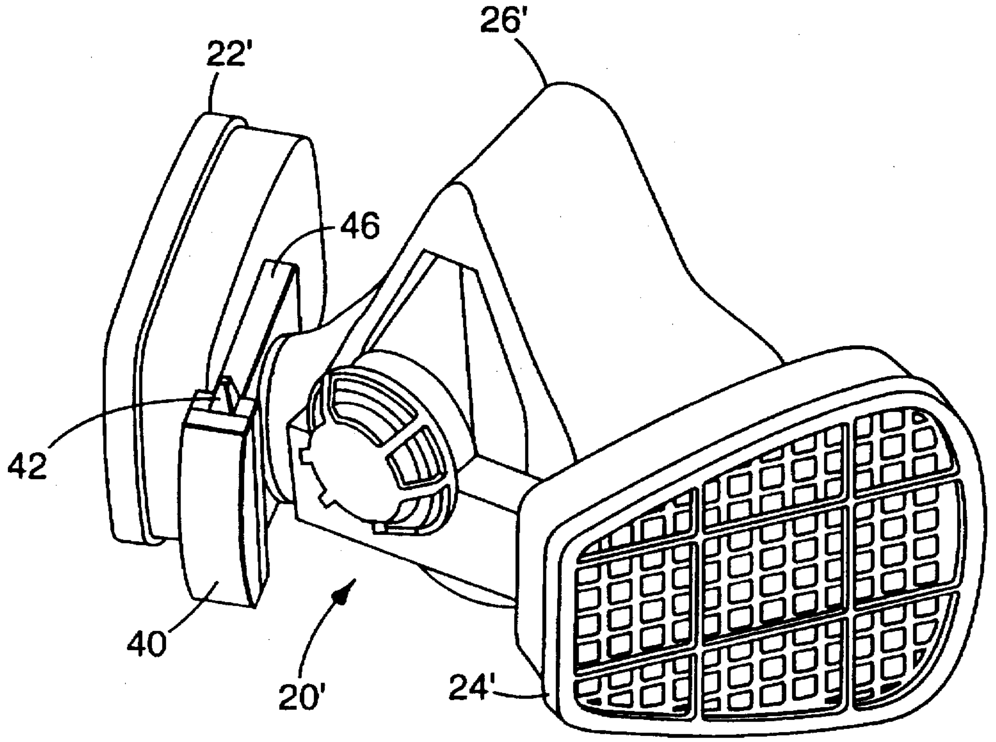
FIG. 2 illustrates an exemplary respirator with an exposure indicator is releasably attached to a flow-through housing interposed between a respirator cartridge and the face mask.

FIG. 2 is an alternate respirator system 20' in which a flow-through housing 46 is interposed between air purifying respirator cartridges 22' and a face mask 26' (see FIG. 10). The exposure indicating apparatus 40 is releasably attached to the flow-through housing 46, as will be discussed in more detail below.

Figure 3:
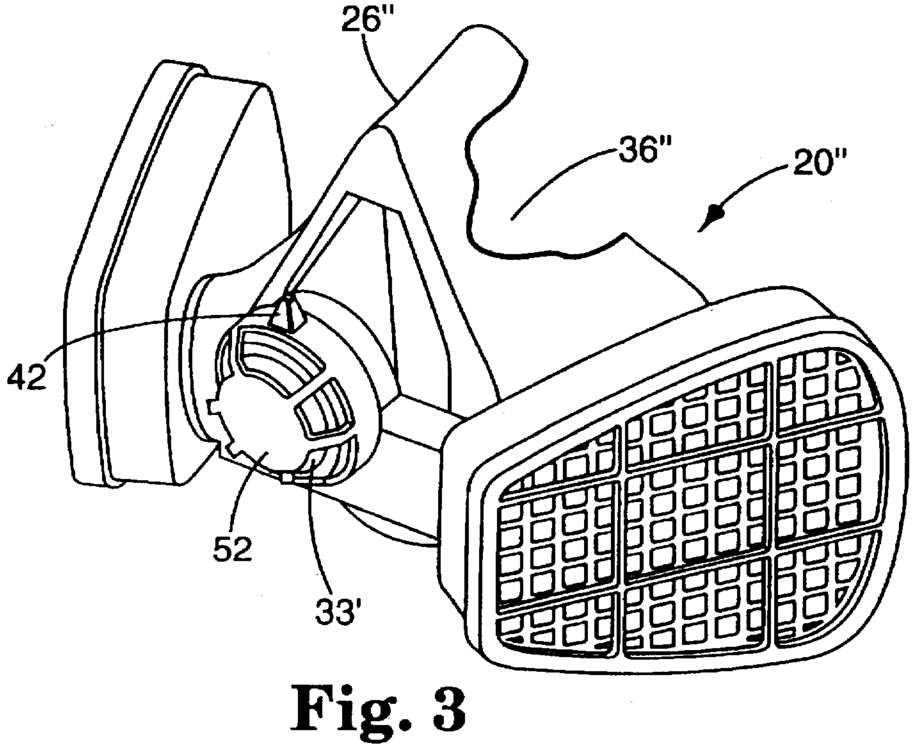
FIG. 3 illustrates an exemplary respirator with an exposure indicator releasably attached to the face mask.

FIG. 3 is an alternate embodiment in which an exposure indicating apparatus 52 is releasably attached to a face mask 26" on a respirator system 20". In this embodiment, a sensor (not shown) is in fluid communication with a face mask chamber 36". Alternatively, the sensor may be located along an exhaust path 33' (see FIG. 1A), which forms part of the flow-through path. It will be understood that a check valve (not shown) is required to prevent ambient air from entering the face mask 26" through the exhaust path 33'. In order for the sensor to evaluate the air in the face mask 26", rather than the ambient air, the sensor must be upstream of the check valve.

Figure 20:
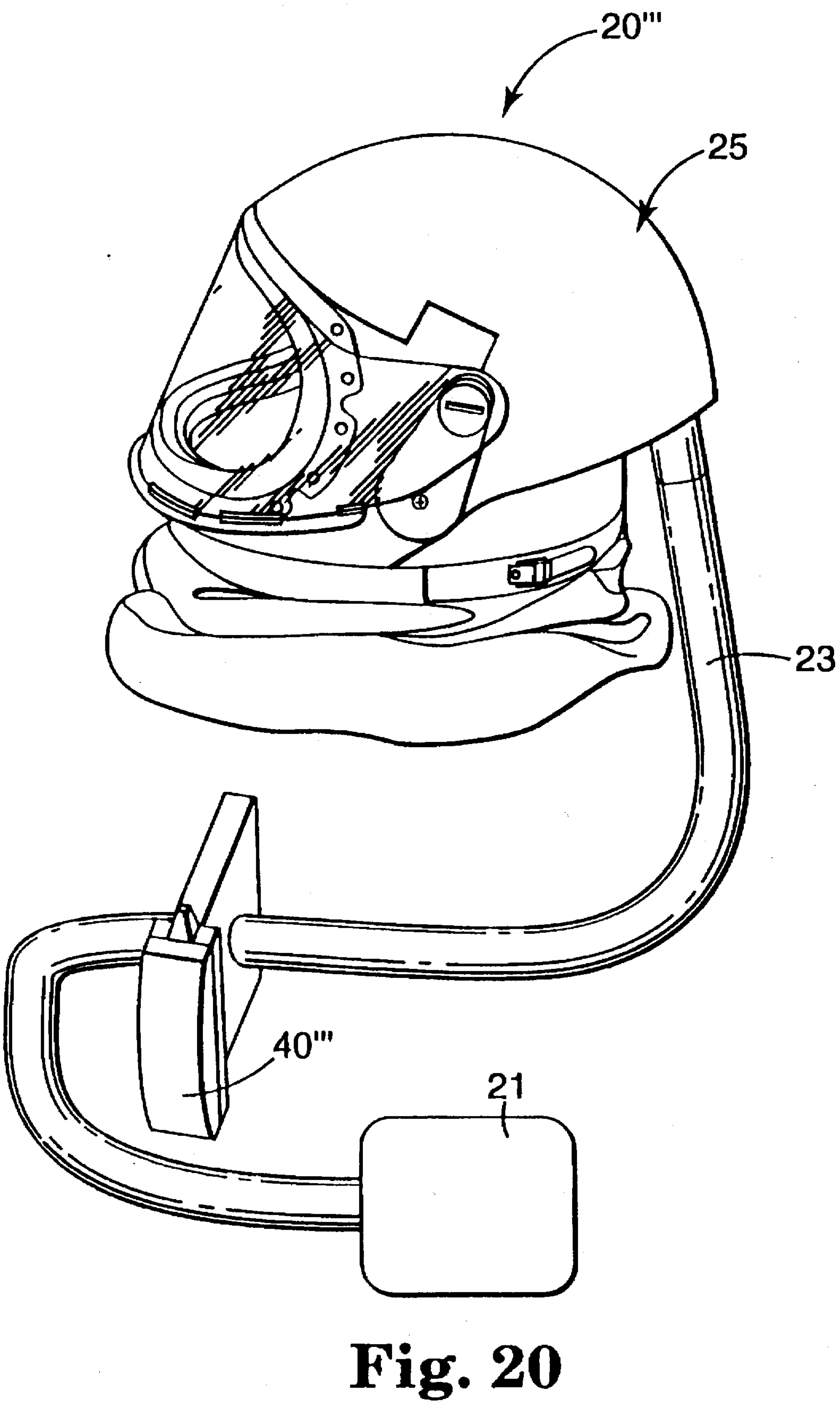
FIG. 20 is an exemplary embodiment of a powered air or supplied air respirator with a releaseable exposure indicator.

FIG. 20 illustrates an exemplary embodiment of a powered air or supplied air respirator system 20'". An air supply 21 is used to provide air to the user through an air supply tube 23. It will be understood that the air supply 21 may either be a fresh air source or a pump system for drawing ambient air through an air purifying cartridge. An exposure indicating apparatus 40'" may be fluidically coupled to the air supply at any point along the flow-through path including air supply tube 23, air supply 21, or directly to helmet 25 to monitor the presence of target species.

Figure 8:
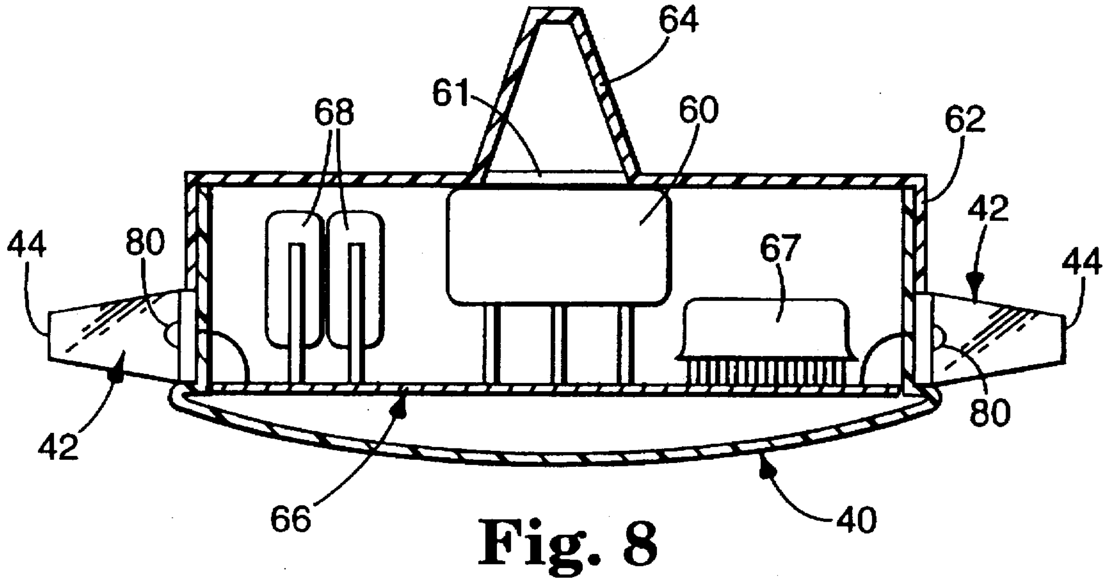
FIG. 8 is a sectional view of the exposure indicating apparatus of FIGS. 4 and 5.

FIG. 8 illustrates a cross sectional view of exposure indicating apparatus 40. A sensor 60 is provided in a processor housing 62 in fluid communication with the fluidic coupling 64. The sensor 60 is connected to a processing device 66, that includes a electronic circuit 67 and batteries 68, which will be discussed in greater detail below.

Figure 4:
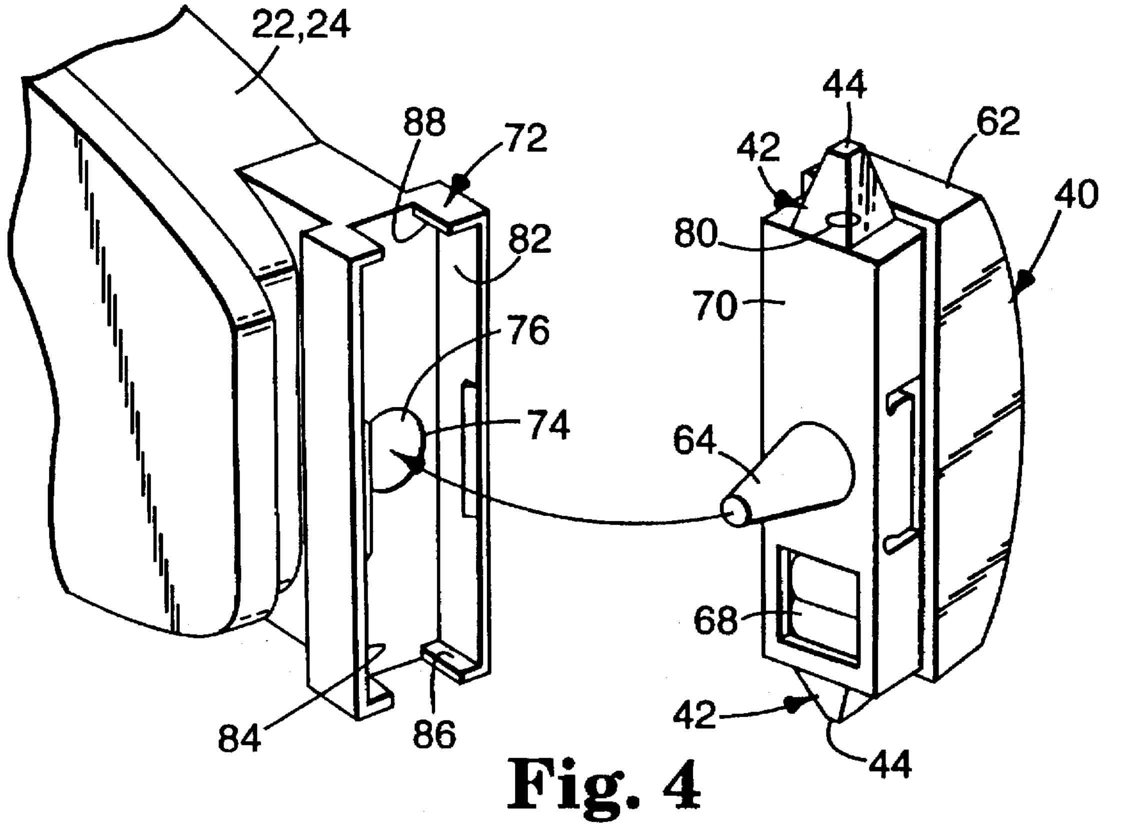
FIG. 4 illustrates an embodiment of an exposure indicating apparatus attachable to a respirator cartridge.

FIG. 4 illustrates a receiving structure 72 attached to the respirator cartridges 22, 24 for releasable engagement with the exposure indicating apparatus 40. The receiving structure 72 has an opening 74 in fluid communication with the sorbent material in the cartridges (see FIG. 1A). A septum or similar closure structure 76 is provided for releasably closing the opening 74 when not engaged with fluidic coupling 64 on the processor housing 62. The fluidic coupling 64 may be tapered to enhance the sealing properties with the opening 74.

Figure 5:
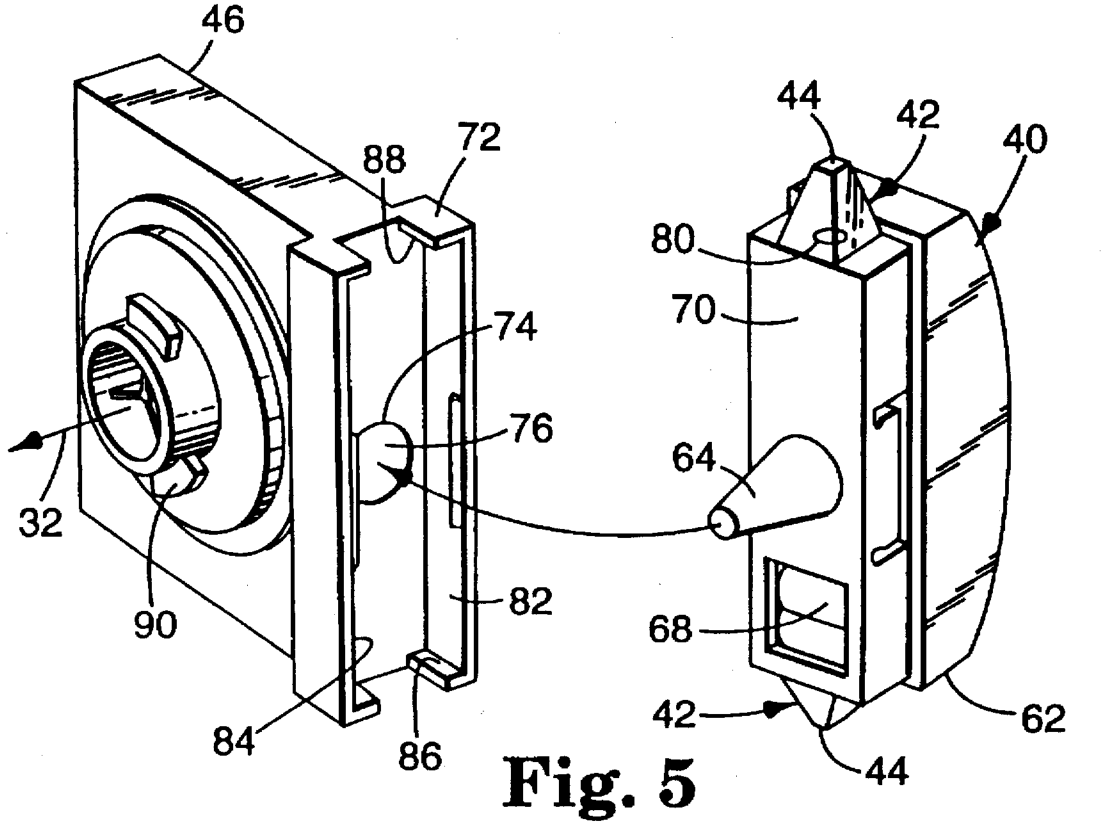
FIG. 5 illustrates an embodiment of an exposure indicating apparatus attachable to a flow-through housing.

FIG. 5 illustrates an alternate embodiment in which a receiving structure 72 is formed on the flow-through housing 46. Flow-through housing 46 has an inner connector 90 and a outer connector (not shown) complementary to the connectors on the face mask 26' and a respirator cartridge 22',24', respectively, as shown in FIG. 2. It will be understood that a wide variety of inner and outer connector configurations for engagement with the face mask and respirator cartridge are possible, such as the connectors illustrated in FIG. 1A, and that the present invention is not limited to the specific embodiment disclosed. The flow-through housing 46 is preferably interposed between at least one of the air purifying respirator cartridges 22', 24' and the face mask 26', as illustrated in FIG. 2.

The receiving structure 72 has a plurality of generally parallel walls 82, 84, 86, 88 which restrict the movement of the processor housing 62 relative to the receiving structure 72. This configuration ensures that the fluidic coupling 64 is perpendicular to the opening 74 when it penetrates the septum 76. The batteries 68 are located on an inside surface 70 of the processor housing 62 so that they are retained in the processor housing 62 when it is engaged with a receiving structure 72 on the cartridge 24. It will be understood that a wide variety of receiving structures are possible and that the present invention is not limited in scope by the specific structures disclosed.

The coupling 64 may include a diffusion limiting device 61, such as a gas permeable membrane, gas capillary, or porous frit plug device which functions as a diffusion limiting element to control the flow of target species to the sensor 60, rendering the sensor response less dependent on its own internal characteristics. It will be understood that a variety of diffusion barriers may be constructed depending on design constraints, such as the target species, sensor construction, and other factors, for which a number of Examples are detailed below.

The porous membrane 61 of the present invention includes any porous membrane capable of imbibing a liquid. The membrane 61 has a porosity such that simply immersing it in a liquid causes the liquid to spontaneously enter the pores by capillary action. The membrane 61, before imbibing preferably has a porosity of at least about 50%, more preferably at least about 75%. The porous membrane 61 preferably has a pore size of about 10 nm to 100 μm, more preferably 0.1 μm to 10 μm and a thickness of about 2.5 μm to 2500 μm, more preferably about 25 μm to 250 μm. The membrane 61 is generally prepared of polytetrafluoroethylene or thermoplastic polymers such as polyolefins, polyarnides, polyimides, polyesters, and the like. Examples of suitable membranes include, for example, those disclosed in U.S. Pat. No. 4,539,256 (Shipman), U.S. Pat. No. 4,726,989 (Mrozinski), and U.S. Pat. No. 3,953,566 (Gore), which are hereby incorporated by reference.

In one embodiment, the diffusion barrier 61, (prepared as described in U.S. Pat. No. 4,726,989 (Mrozinski) by melt blending 47.3 parts by weight polypropylene resin, 52.6 parts by weight mineral oil and 0.14 parts by weight dibenzylidine sorbitol, extruding and cooling the melt blend and extrating with 1,1,1-trichorethane to 11 weight percent oil) was formed by immersing the porous membrane material in heavy white mineral oil (Mineral Oil, Heavy, White, catalog no. 33,076-0 available from Aldrich Chemical Co.). The mineral oil strongly wet the membrane material resulting in a transparent film of solid consistency with no observable void volume. The membrane was then removed from the liquid and blotted to remove excess liquid from the surface. One centimeter diameter samples of the diffusion barrier were mounted in front of a sensor 60 (see FIG. 8).

In another embodiment, a microporous polypropylene membrane material (CELGARD™ 2400, available from Hoechst Celanese Corp.) having a thickness of 0.0024 cm was imbibed with heavy white mineral oil (available from Aldrich Chemical Co.) as discussed above. In yet another embodiment, a potion of the microporous membrane prepared in the first embodiment was imbibed with polypropylene glycol diol (625 molecular weight, available from Aldrich Chemical Co.).

In a series of alternate embodiments, microporous membranes (GELCARD™ 2400, 0.0025 cm thick, available from Hoechst Celanese Co.) were imbibed in solutions of heavy white mineral oil (available from Aldrich Chemical Co.) in xylene (boiling range 137°–144° C., available from EM Science) in concentrations of 5, 10, 15, 20, and 25 percent by volume, respectively. The imbibed membranes were blotted to remove excess liquid and the xylene was allowed to evaporate over 24 hours.

Turning back to FIGS. 4 and 5, the septum 76 allows the processor housing 62 to be removed without separating any of the components of the respirator system 20 and without allowing ambient air to enter the flow-through path at the opening 74. This feature allows the user to replace the batteries 68, substitute a new or different sensor 60, or perform other maintenance on the exposure indicator 40 without leaving the area containing the target species.

Figure 15:
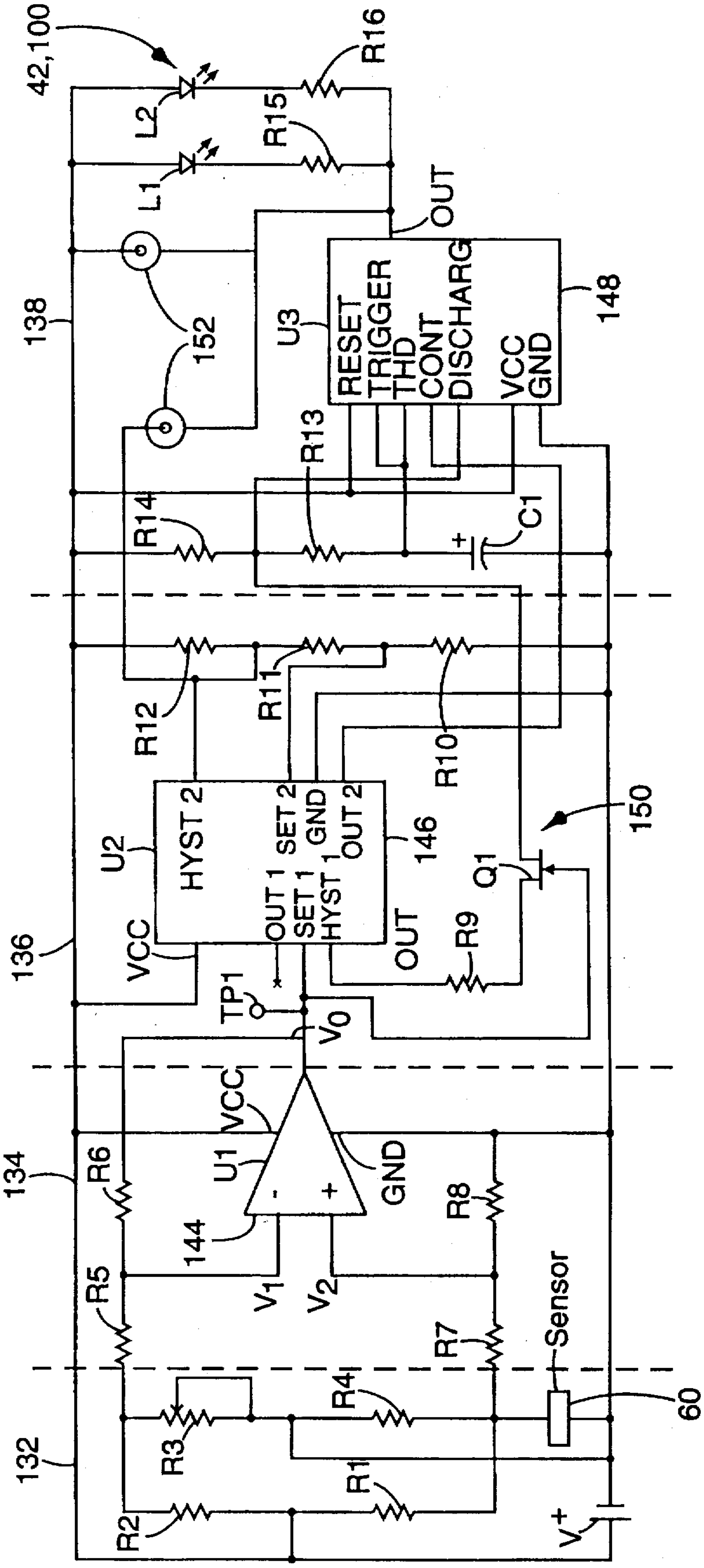
FIG. 15 as an alternate circuit diagram for a processing device according to FIG. 13.

The indicators 42 include a transparent or semi-transparent housing 44 covering a light emitting diode (LED) 80. The indicators 42 are symmetrically arranged on the processor housing 62 so that engagement of the processor housing 62 with the filter cartridges 22, 24 is not orientation specific. It will be understood that a single LED may be used with a processor housing that can only be oriented in a specific manner relative to the receiving structure 72. Alternatively, the indicator 42 may comprise an acoustical generator, or a vibro-tactile generator, such as a motor with an eccentric cam, or some combination of devices, for example, visual and audible indicators as generally illustrated by circuits thereof as shown in FIG. 15. In an embodiment in which more than one indicator type is provided, the various indicators are preferably responsive to a single concentration signal, as will be discussed below.

Figure 6:
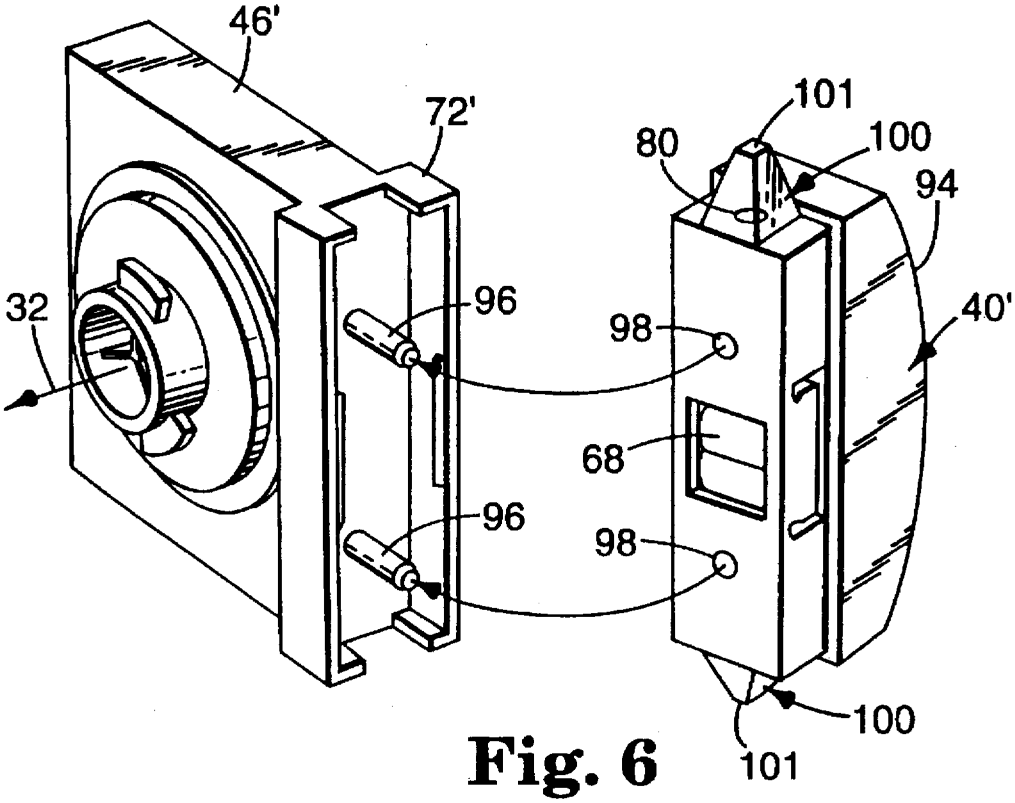
FIG. 6 illustrates an embodiment of an exposure indicating apparatus attachable to a flow-through housing.

FIG. 6 illustrates an alternate embodiment of the exposure indicator 40' in which sensor 60' is located in the flow-through housing 46' (see FIG. 10). It will be understood that the sensor 60' may be located at a variety of locations in the flow-through housing 46', and that the present invention is not limited to the embodiment illustrated.

Figure 7:
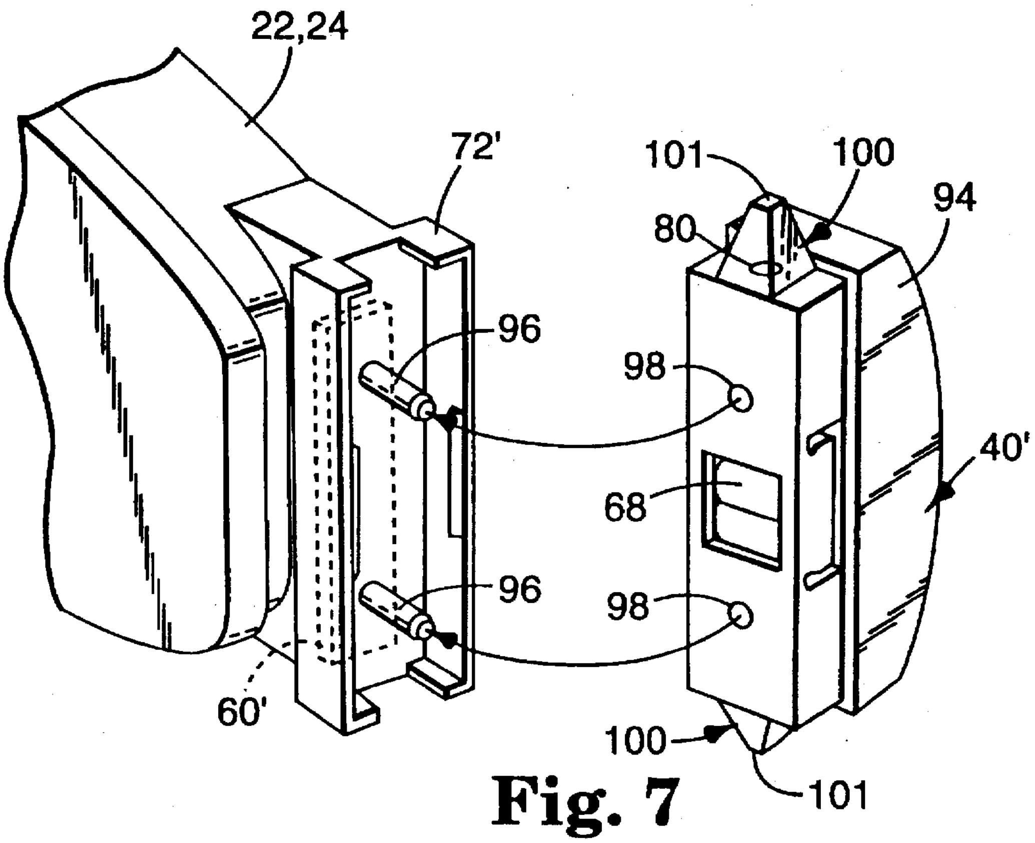
FIG. 7 illustrates an embodiment of an exposure indicating apparatus attachable to a respirator cartridge.

FIG. 7 illustrates an alternate embodiment of the exposure indicator 40' in which the sensor 60' is located in a respirator cartridge 22, 24. The location of the sensor 60' within the cartridge 22, 24 may be changed without departing from the scope of the present invention. An electrical or optical feed-through 96 is provided on receiving structure 72' for connecting the reversible sensor 60' with the processing device (see generally FIG. 10) contained in processing housing 94. Openings 98 are provided on the processor housing 94 for receiving the feed-through 96. The processor housing 94 contains a pair of symmetrically arranged indicators 100 which include transparent or semi-transparent covers 101 containing LEDs 80.

Figure 9:
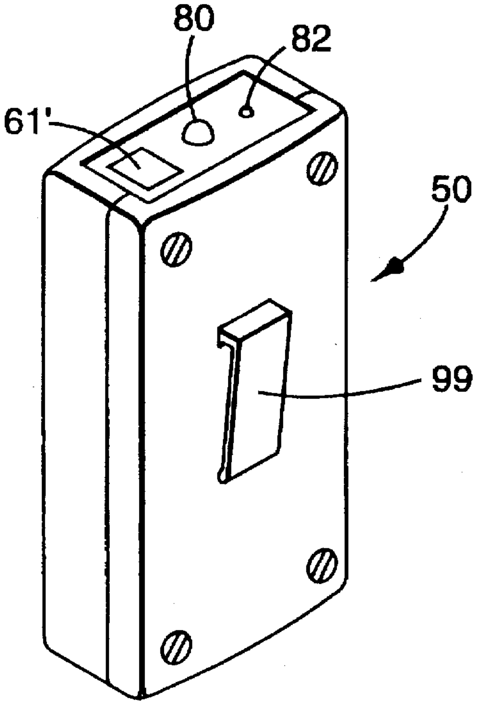
FIG. 9 illustrates a personal or environmental exposure indicator configuration.

FIG. 9 is an alternate embodiment in which the processing device 66 of FIG. 8 is configured as a personal exposure indicator 50 to be worn on a user's clothing or as an environmental indicator located in a specific area. A clip 99 may optionally be provided to attach the exposure indicator 50 to the user's belt or pocket, similar to a paging device. A sensor (see FIG. 8) is preferably located behind a gas permeable membrane 61'. An LED 80 is provided for signaling the concentration of the target species or operating information to the user. An audible alarm 82 or vibro-tactile alarm 152 (see FIG. 15) may also be provided. It will be understood that the exposure indicator 50 may be constructed in a variety of configurations suitable for specific applications. For example, the exposure indicator 50 may be configured to fit into the dashboard of a vehicle or be permanently located in a specific location, such as mounted on a wall similar to a smoke detector. The environmental indicator embodiment may be connected to a variety of power sources, such as household current.

Sensors

The sensor 60, 60' is selected based on at least one property which is responsive to the concentration of a target species. As such, there are a number of properties of materials used as sensors that can be monitored by the processing device in order to generate a concentration signal. The properties include, for example:

1. A temperature change, produced by heat of adsorption or reaction, may be sensed with a thermocouple, a thermistor, or some other calorimetric transducer such as a piezoelectric device with a resonant oscillation frequency that is temperature sensitive, or a position sensitive device that is temperature sensitive, like a bimetallic strip.

2. A mass change can be detected by a change in resonant frequency of an oscillating system, such as a bulk wave piezoelectric quartz crystal coated with a film of a sensing medium. A related and more sensitive approach is use of surface acoustic wave (SAW) devices to detect mass changes in a film. The devices consist of interdigitated micro-electrodes fabricated on a quartz surface for launching and detecting a surface propagating acoustic wave.

3. A change in size or volume results in a displacement which may be detected by any position sensitive type of transducer. It may also cause a change in resistivity of a multi-component sensing medium, such as a conducting-particle loaded polymer or nanostructured surface composite films, such as taught in U.S. Pat. No. 5,238,729.

4. A change in comples electric permittivity, such as AC impedance or dielectric, may be detected. For example, the AC impedance can be measured or the electrostatic capacitance can be detected by placing the sensing medium on the gate of a field effect transistor (FET).

5. A change in the linear or nonlinear complex optical constants of a sensing medium may be probed by some form of light radiation. At any desired optical wavelengths, the detector may sense changes in the probe beam by direct reflection, absorption or transmission (leading to intensity or color changes), or by changes in phase (ellipsometric or propagation time measurements). Alternatively, a change in refractive index of the sensing medium may be sensed by a probing light when it is in the form of a propagating surface electromagnetic wave, such as generated by various internal reflection methods based on prism, grating or optical fiber coupling schemes.

6. A change in magnetic permeability of a sensing medium may also be produced by the target species and be sensed by a range of electromagnetic frequency coupled methods.

7. A change in resistivity or conductivity as a result of the target species interacting with a sensing medium may be measured. The electrical resistance could be a bulk resistivity or a surface resistivity. Examples of sensors utilizing surface resistivity include sensors based on semiconductor surface resistances, or organic, inorganic, polymer or metal thin film resistances "Chemiresistors").

8. If the sensing property is electrochemical, the target species can cause a change in electrochemical potential or emf, and be sensed potentiometrically (open circuit voltage) or the target species can electrochemically react at the interface and be sensed amperometrically (closed circuit current).

9. The target species may cause optical emission (fluorescent or phosphorescent) properties of a sensing medium to change. When stimulated at any arbitrary wavelength by an external probe beam, the emitted light can be detected in various ways. Both the intensity or phase of the emitted light may be measured relative to the exciting radiation.

10. Electronic surface states of a sensing medium substrate may be filled or depleted by adsorption of target species and detectable by various electronic devices. They may, e.g., be designed to measure the influence of target species adsorption on surface plasmon propagation between interdigitated electrodes, or the gate potential of a chemical field effect transistor "a ChemFet").

11. A change in bulk modulus of elasticity (or density) of a sensing medium may be most easily sensed by phase or intensity changes in propagating sound waves, such as a surface acoustic wave (SAW) device which is also sensitive to mass changes.

Generally, for any property measurement of a sensing medium, the sensitivity range of a particular sensor depends on the signal to noise ratio and the dynamic range (the ratio of the maximum signal measurable before the sensor saturates, to the noise level). It will be understood that the measurement of the property may depend on either the processing device or the specific sensor selected, and that both the sensor selection and design of the processing device will also depend on the target species. Therefore, the listing of sensing medium properties and measurement techniques are exemplary of a wider array of sensors and techniques for measurement thereof available for use in conjunction with the exposure indicator of the present invention. This listing should in no manner limit the present invention to those listed but rather provide characteristics and properties for many other sensing mediums and techniques that may be utilized in conjunction with the present invention.

The preferred sensor is based on nanostructured composite materials disclosed in U.S. Pat. No. 5,238,729 issued to Debe, entitled SENSORS BASED ON NANOSTRUCTURED COMPOSITE FILMS, and U.S. Pat. No. 5,338,430 issued to Parsonage et at., on Aug. 16, 1994, entitled NANOSTRUCTURED ELECTRODE MEMBRANES, which are hereby incorporated by reference. In particular, the latter reference disclose electrochemical sensors in the limiting current regime and surface resistance sensors. These reversible sensors have the advantage that if they are inadvertently exposed to the toxic environment, such as by a momentary interruption of the face seal of the respirator during replacement, they do not become saturated and unusable.

As discussed above, the sensor 60, the batteries 68, the processing device 66 and the indicators 42 (or 100 in FIGS. 6 and 7) provide an active exposure indicator having an alarm signaling system in accordance with the present invention. The exposure indicator utilizes a variable frequency alarm signal to provide the user with enhanced information about the status of the environment and the detector. For example, during a nonhazardous state, the exposure indicator periodically provides a positive indication to the user that the batteries are charged and that the exposure indicator is on and ready to function with no action required by the user. The indicator provides this positive indication using the same alarm signaling system as used in indicating a hazardous state. Thus, the user is continually and automatically affirmed that the exposure indicator is in the state of readiness and is properly functioning. In addition, the exposure indicator provides a sensory signaling indication, whether visual, audible, vibrational, or other sensory stimulation, to the user which varies according to a concentration of a gas or target species in the environment. This provides the user with a semiquantitative measure of the hazard level as well as a qualitative sense of the concentration's rate of change.

In one embodiment, a two state LED flashing alarm protocol is used with a single color LED. The protocol indicates the two conditions without the user having to interrogate the device, for example, such as by pushing a switch button. The two signal states include:

Ready, "OK" state. The LED flashes continually but very slowly at a baseline flash frequency, for example, once every 30 seconds, to inform the user that the battery and all circuits of the exposure indicator are functioning within design parameters established for the exposure indicator.

Alarm state. The LED flashes rapidly, for example, 4 times per second, when the target species concentration exceeds a selectable threshold concentration and then varies as a function of the concentration of the target species.

Figure 11:
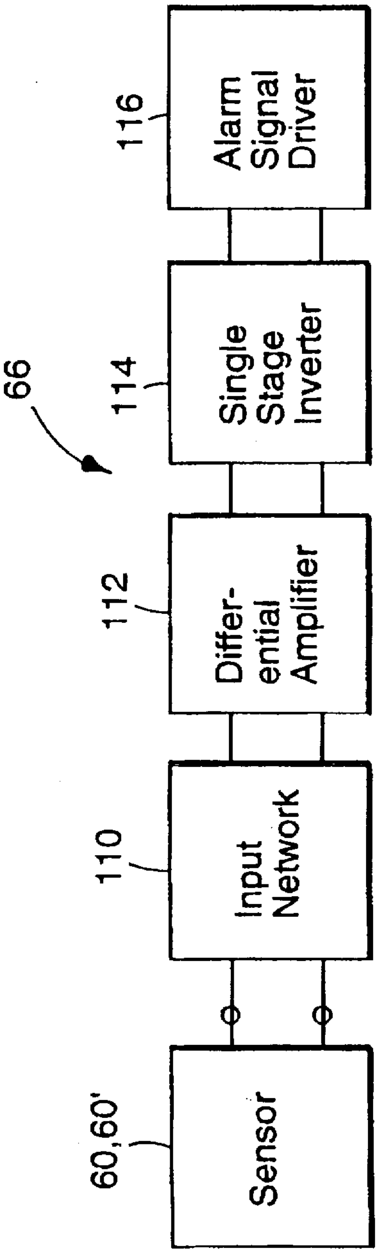
FIG. 11 is a general block diagram of a processing device of the present invention.

FIG. 11 is a general block diagram of the processing device 66 for carrying out the above described two state alarm signaling protocol. The processing device 66 includes four circuit stages: input network 110; differential amplifier 112; single stage inverter 114; and alarm driver 116. The input network 110 is connected to the sensor 60, 60'. It will be apparent from the description herein that specific circuitry for each stage will depend on the specific systems utilized. For example, the input network will be different for other types of sensors, the amplifier and the inverter stages may be combined or expanded to include other signal conditioning stages as necessary, and the signal driver stage will be dependent on the indicator signaling device or devices utilized. Therefore, the circuit configurations, described in conjunction with the general block diagram of FIG. 11 for carrying out the alarm signal protocols, and other enhancements therefore, are only examples of circuit configurations and are not to be taken as limiting the claimed invention to any specific circuit configuration. For example, circuitry may be utilized to provide for multiple threshold devices to indicate a series of concentration levels or such circuitry may provide for a continuously variable alarm signal as a function of the target species concentration.

Figure 12:
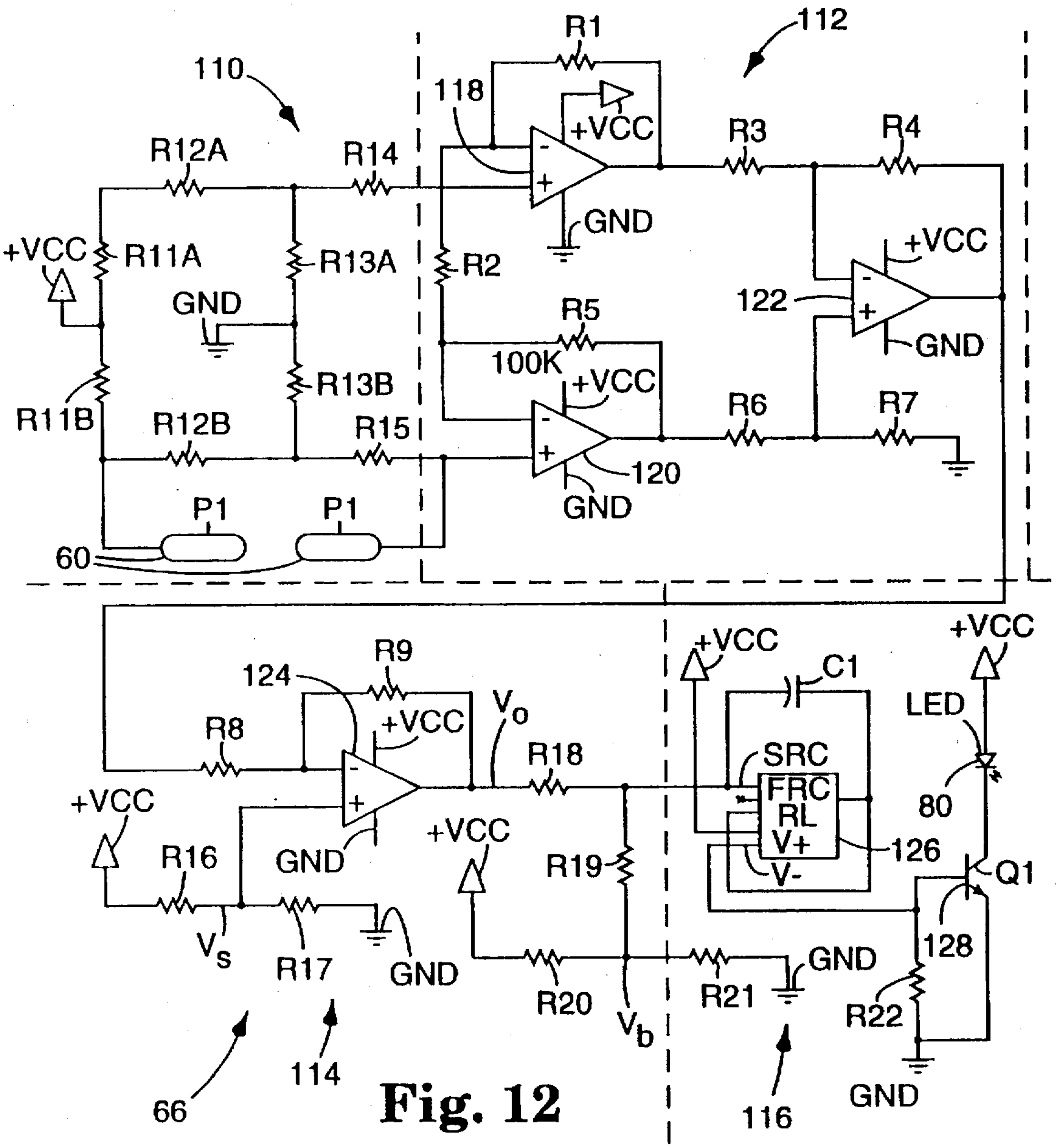
FIG. 12 is an exemplary circuit diagram for a processing device according to FIG. 11.

FIG. 12 is a circuit diagram of one embodiment of the processing device 66 shown generally in FIG. 11. The general functions performed by the blocks as shown in FIG. 11 will be readily apparent from the description of FIG. 12. Generally, the input network 110 provides for biasing or appropriate connection of the sensor 60, 60' utilized with the exposure indicator to provide an output to the differential amplifier 112 that varies as a function of target species concentration in an environment. The differential amplifier 112 and the single stage inverter provide for amplification and signal conditioning to provide an output to the alarm signal driver 116 for driving the LED in accordance with the alarm signal protocols further described below. Such protocols may include the use of a baseline flash frequency, a turn on threshold level, and a varying rate of frequency increase in response to the sensor output.

In further detail with reference to FIG. 12, the component values are as set forth in Table 1 below for curve C of FIG. 16:

TABLE 1

| | | | |
|---|---|---|---|
| R1 = 100K ohms | R8 = 10K ohms | R13B = 4.9K ohms | R20 = 3.51K ohms |
| R2 = 4.02K ohms | R9 = 100K ohms | R14 = 200K ohms | R21 = 46.5K ohms |
| R3 = 100K ohms | R11A = 49.9K ohms | R15 = 200K ohms | R22 = 1K ohms |
| R4 = 100K ohms | R11B = 49.9K ohms | R16 = 87.3K ohms | C1 = 400 ufd |
| R5 = 100K ohms | R12A = 4.9K ohms | R17 = 16.7K ohms | |
| R6 = 100K ohms | R12B = 4.9K ohms | R18 = 332K ohms | |
| R7 = 100K ohms | R13A = 4.9K ohms | R19 = 2.21 ohms | |

The input network 110 is connected to an electrochemical sensor 60 operating in a two electrode amperometric mode. The resistor values of R11A, R11B, R12A, R12B, R13A, R13B, R14, and R15, of the input network 110 provide biasing of the counter electrode of the electrochemical sensor 60 with respect to its working electrode. The amount of bias is adjustable by the relative magnitudes of resistors R11(A,B), R12(A,B), and R13(A,B). Input networks for other electrochemical configurations (potentiometric, three electrode, etc.), or other sensing means, (e.g. optical or thermal), can be similarly accommodated.

The differential amplifier stage 112 includes operational amplifiers 118, 120 and 122 connected in a two stage configuration utilizing resistors R1, R2, R3, R4, R5, R6, and R7. The non-inverting inputs of the operational amplifiers 118 and 120 are provided with the output of the input network 110. The gain of the differential amplifier is easily controlled by the value of resistor R2.

The single stage inverter 114 includes operational amplifier 124 for receiving the output of the differential stage 112. The gain of the single stage inverter is easily controlled by the resistor network ratio of R9/R8, while the signal offset from the inverting amplifier 124 is determined by voltage $V_s$ which is determined by the ratio of resistors R16/R17. The value of $V_s$ sets a threshold value for the processing device 66 as further described below. As indicated above, the differential amplifier stage and the inverter stage may be combined or expanded to include other signal conditioning devices. The operational amplifiers 118–124 may be any appropriate operational amplifiers, such as the LM324A amplifiers available from National Semiconductor Corp.

The alarm signal driver 116 includes an LED flasher/oscillator circuit 126, available as an LM3909 circuit from National Semiconductor Corp. The LED flasher/oscillator circuit 126 receives the output of the single stage inverter after the output voltage $V_o$ of the inverting amplifier 124 is acted upon by the resistor network of R18, R19, R20, R21. The LED flash frequency is determined by capacitor C1, $V_o$, and voltage Vb, which is determined by the ratio of R20/R21. The LED indicator 80 is then driven by pulses from the LED flasher/oscillator circuit 126 through transistor 128. The alarm signal driver may be any appropriate driver device for driving the indicator or indicators utilized.

Figure 16:
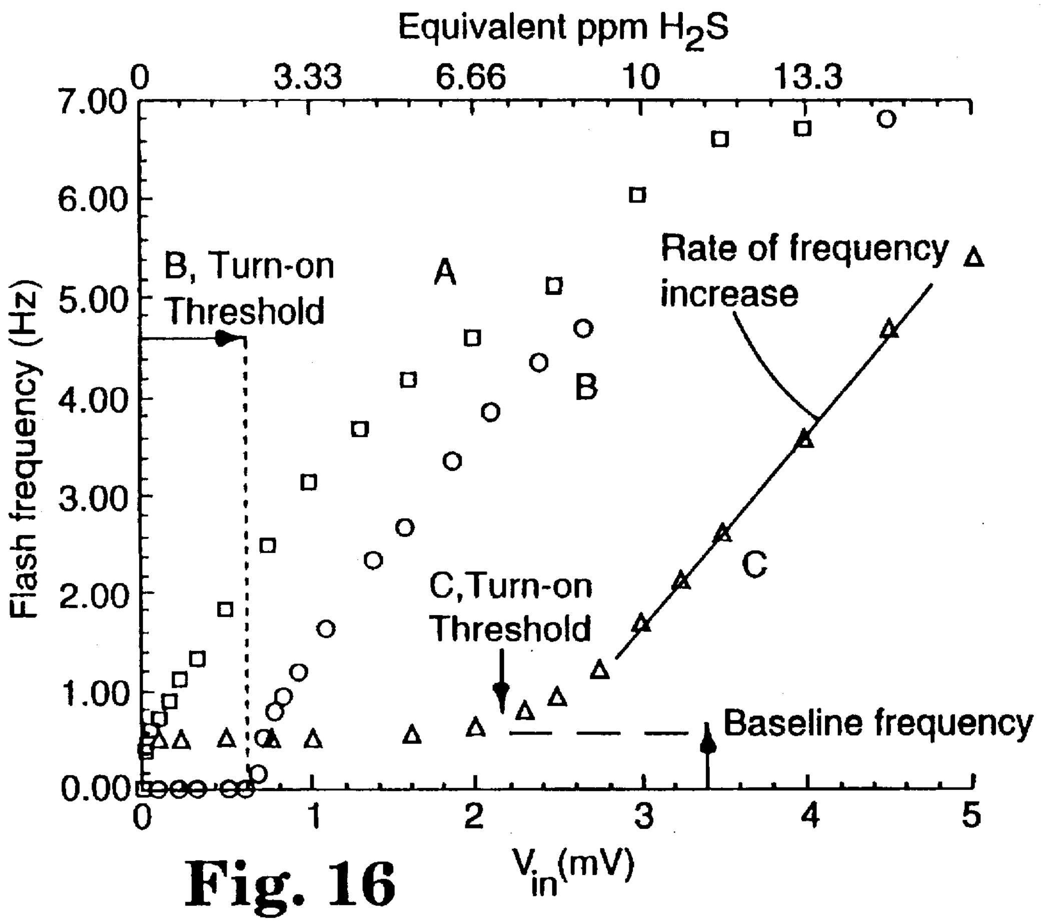
FIG. 16 is a graph showing three alarm signal protocols utilizing the circuit of FIG. 12.

Three different example subset protocols as represented by the curves A, B, and C, as shown in FIG. 16, of the two state flashing protocol can be chosen with respect to the circuit of FIG. 12 by selecting which conditions the user wants indicated. The first subset signal protocol is shown by Curve A of FIG. 16. Curve A shows a flash frequency of the LED indicator that continuously increases from a concentration of zero as the millivolt signal is increased, corresponding to an increasing concentration of target species; in this case $H_2S$. No baseline frequency or threshold concentration is utilized. A user can get an indication of the actual concentration of the toxic target species by noting the flash frequency rate, or could count the flashes in a given period of time to get a more quantitative estimate of the concentration. The component values are set forth in Table 1, except R16, R17, R20 and R21 for Curve A of FIG. 16, which are not critical to this example.

In the second subset signaling protocol as shown by Curve B of FIG. 16, the flash frequency of the LED alarm remains at zero with the LED off, until a turn-on threshold value of the millivolt signal corresponding to the threshold concentration level of target species is exceeded, after which the flash frequency varies monotonically with sensor output. No baseline frequency is chosen for indicating a ready state. The value of the turn-on threshold voltage is varied by varying the values of resistors R16 and R17. When resistor R16 was 91,600 ohms and resistor R17 was 12,800 ohms, and the other components are as given in Table 1, the flash frequency of the LED alarm is given as shown by Curve B.

In the third subset protocol, the flash frequency of the LED alarm is shown by Curve C of FIG. 16. This protocol includes both a turn-on threshold and a baseline frequency. The LED alarm flashes at a constant, selectable rate, verifying that all systems are working, for all sensor output values below the turn-on threshold. The turn-on threshold is also selectable and after the threshold has been reached, the LED alarm flashes at a rate proportional to the sensor output.

Again, the value of the turn-on threshold voltage is varied by varying the values of resistors R16 and R17, but in this protocol, the value of the baseline frequency is also varied by varying the values of resistors R20 and R21. When resistor R16 is 87,300 ohms, resistor R17 is 16,700 ohms, resistor R20 is 3,510 ohms, and resistor R21 is 46,500 ohms, the flash frequency of the LED alarm is given approximately by the values shown in Curve C which shows a constant baseline frequency until a threshold voltage (approximately 2.3 mV) is exceeded, followed by a monotonic flash frequency increase with increase of sensor output. The rate of frequency increase with sensor output, i.e., the slopes of curves, can be controlled by varying the values of resistor R2 and the ratio of resistors R9/R8.

Generally, the protocols as described above are controllable by simply varying certain resistor values in the circuit of FIG. 12. For example, the voltage VS applied to the noninverting input of operational amplifier 124 is determined by the ratio of R16/R17. The value of VS determines the threshold value. The voltage Vb, determined by the ratio of R20/R21, determines the baseline frequency and the rate of frequency increase with the sensor output is controllable by the value of R2 and the ratio of R9/R8.

Generally describing the above circuit of FIG. 12, the sensor 60 has an electrochemical property that is responsive to a concentration of a target species. The processing device 66 generates a concentration signal as a function of that property and the indicator is driven by the processing device 66 at an exposure signaling rate, i.e. the flashing frequency, that varies as a function of the concentration signal.

This same circuit provides for generating a threshold signal in response to the concentration signal when a predetermined threshold concentration is attained; the threshold determined by the voltage VS. The LED indicator is then activated at a threshold exposure signaling rate corresponding to the predetermined threshold concentration. Likewise, when the baseline frequency is set via Vb, the LED indicator is driven at a ready signaling rate indicative of a device operating within predefined design parameters.

In another embodiment, a three state flashing alarm protocol is used with a single color LED. The protocol indicates the three conditions without the user having to interrogate the device, for example, such as by pushing a switch button. The three signal states include:

Ready, "OK" state. The LED flashes continually but very slowly, for example, once every 30 seconds, to inform the user that the battery and all circuits of the exposure indicator are functioning within design parameters established for the exposure indicator.

Alarm state. The LED flashes rapidly, for example, 4 times per second, when the target species concentration exceeds a selectable threshold concentration and then may vary as a function of the concentration of the target species.

Fault state. The LED flashes at an intermediate rate, for example, once every 4.0 seconds, indicating that the battery needs to be replaced or some other fault has occurred in the exposure indicator.

Figure 13:
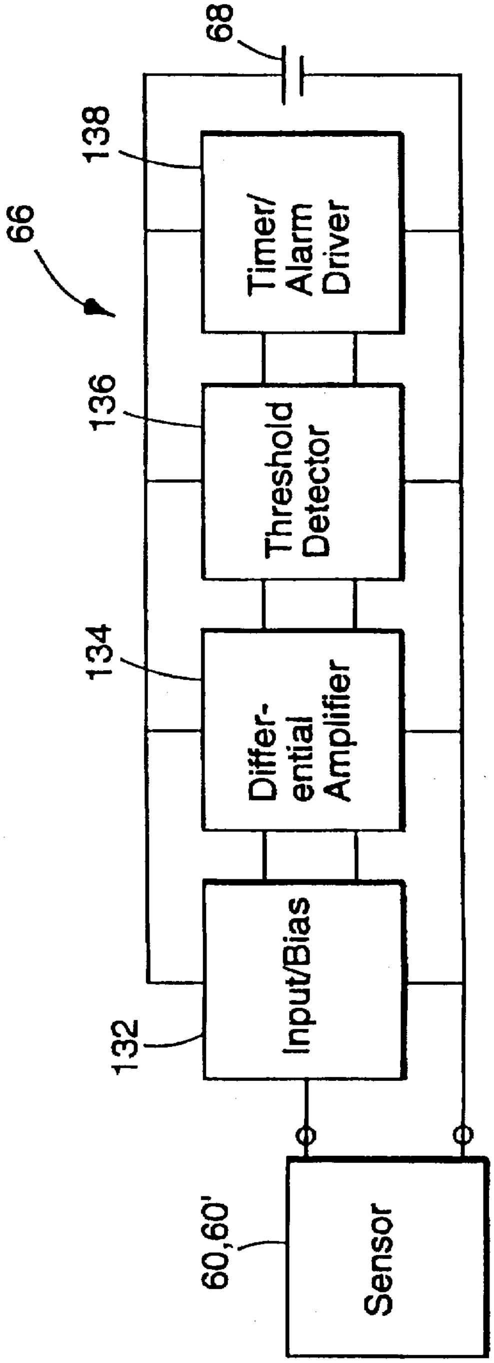
FIG. 13 is a general block diagram of an alternate processing device of the present invention.

FIG. 13 is a general block diagram of the processing device 66 for carrying out the above described three state alarm signaling protocol. The processing device 66 includes four circuit stages:input bias network 132; differential amplifier 134; threshold detector 136; and alarm driver 138. It will be apparent from the description herein that specific circuitry for each stage will depend on the specific systems or elements utilized just as described with regard to FIG. 11.

Figure 14:
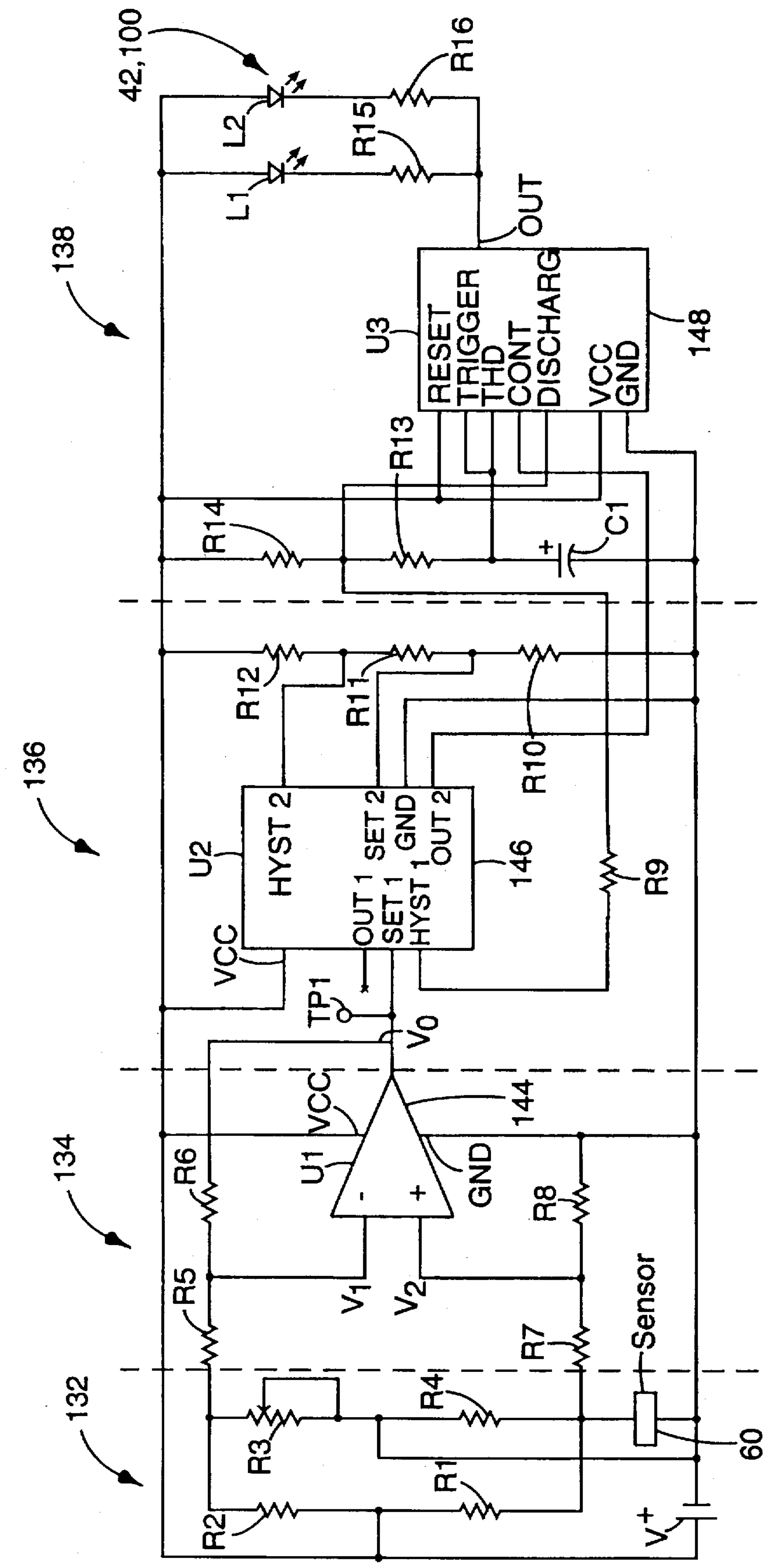
FIG. 14 is a circuit diagram for an exemplary processing device according to FIG. 13.

Generally, the input/bias circuit 132 provides for biasing or appropriate connection of the sensor 60, 60' utilized with the exposure indicator to provide an output to the differential amplifier 134 that varies as a function of target species concentration in the environment. For example, the circuit may provide a bias potential, for example, 0.25 volt, across the working and counter electrodes of a sensor element and convert the sensor current into a voltage for comparison with a reference voltage as is shown in FIG. 14.

The differential amplifier 134 amplifies the difference between the output of the input portion of circuit 132 and the reference voltage portion of 132 to provide an amplified signal that varies as a function of target species concentration to the threshold detector 136. For example, the differential amplifier may amplify the difference between the sensor output and a reference voltage by a factor of R8/R7 and present it to the threshold detector 136, superimposed on a selectable offset determined by the reference voltage of the input/bias circuit 132 as shown in FIG. 14.

The threshold detector 136 senses both the output $V_o$ from the differential amplifier 134 and the battery voltage $V^+$ to detect whether the output $V_o$ has exceeded a predetermined threshold level or whether the battery voltage has dropped below a certain voltage level. The threshold detector 136 may include a voltage detector 146, FIG. 14, having programmable voltage detectors which are individually programmed by external resistors to set voltage threshold levels for both over and under voltage detection and hysteresis as further described below. The threshold detector 136, provides an output to the timer/alarm driver 138 such that the LED indicator is driven at a ready signalling rate to indicate to the user that the indicator is functioning within defined design parameters. When the output $V_o$ exceeds the threshold level or the battery voltage drops below a set voltage level, the threshold detector 136 causes the timer/alarm driver 138 to change its alarm flash frequency, for example, from once every 30 seconds for the ready state to 4 times per second when the threshold level is exceeded, or from once every 30 seconds to once every 4 seconds if the battery voltage drops below the set voltage level.

The timer/alarm driver 138 provides the means to select various alarm event frequencies and drive various visual (LEDs), audible, vibro-tactile, or other sensory alarms in response to the output from the threshold detector 136. The timer/alarm driver 138 may include, for example, a general purpose timer 148, as shown in FIG. 14, connected for use in an astable multivibrator mode as part of timer/alarm driver 138 to provide such driving capabilities.

FIGS. 14 and 15 are exemplary circuit diagrams of the processing device 66 shown generally in FIG. 13. Various values for components of the circuit are shown in Table 2 below:

TABLE 2

| | | | |
|---|---|---|---|
| R1 = 2.55M ohms, 1% | R6 = 20M ohms, 1% | R11 = 976 k ohms, 1% | R16 = 182 ohms, 5% |
| R2 = 255K ohms, 1% | R7 = 100K ohms, 1% | R12 = 365K ohms, 1% | C1 = 4.7 ufd |
| R3 = 19.25K ohms, trimmed | R8 = 20M ohms, 1% | R13 = 4.53M ohms, 2% | |
| R4 = 200K ohms | R9 = 71.5K ohms, 2% | R14 = 12.1M ohms, 5% | |
| R5 = 100K ohms, 1% | R10 = 787K ohms, 1% | R15 = 182 ohms, 5% | |

In general, the circuits use CMOS versions of three standard integrated circuits for extremely low current operation. The integrated circuits are available in miniamrized surface mount packaging for printed circuit board fabrication or chip form for wire bonding in a ceramic hybrid circuit. The supply current required when the LED is not flashing is only 94 μamps, and a time weighted average of 100.8 μamps when the alarm signal is flashing once every 30 seconds. The circuit can be packaged as an 8 pin Dual In-line Package (DIP) with maximum overall dimensions of about 1×2×0.3 cm. Radio frequency shielding is expected to be necessary for industrial use, and will be a necessary part of the design of the housing of the exposure indicator. The circuit of FIG. 13, packaged as a DIP without the sensor, batteries and LEDs, will require an additional interconnection to the latter, such as a metal framework with battery and sensor socket, or a solderable flexible connector strip. The circuit common or 'ground' for all these components should make contact with the RF shielding of the outer housing at one point only.

The limited available space and weight considerations inhibits the use of AA or larger size batteries with the respirator mounted exposure indicator, and the longest lifetime demands the highest energy capacity feasible. A battery voltage in excess of 2 volts is required for operation of most integrated circuit devices. A single battery having a voltage over 3 volts is desired to avoid having to use multiple batteries. Because the circuit requires only 94 μA to operate outside an alarm event, low current drain "memory back-up" type batteries can be utilized. The battery 68, shown in FIG. 13, is specifically selected to be lithium thionyl chloride 3.6 volt cell because of the batteries exceptional constant discharge characteristics (so that additional power conditioning circuitry is not necessary), high energy capacity, and slightly higher cell voltage than other Li cells. The specific batteries selected for use include the Tadiran™ model TL-5101 battery and the Tadiran™ TI-5902, although various manufacturers provide other similar type batteries. The TL-5101 is less desirable because of its voltage change when power is first applied to the circuit. The TL-5101 is also less desirable and the TL-5902 cells are preferred since the TL-5101 may not be able to supply alarms which might require significantly larger pulse currents. Performance data show $V^+$ remains between 3.47 and 3.625 volts for −25° C.<T<70° C. The batteries are available in various terminal forms, viz. spade, pressure and plated wire, and meet UL Std. 1642. In a ½ AA size, this battery has 1200 mA-Hr capacity; adequate for ~1 year of continuous operation under 100 μA current drain. In the embodiment utilizing the exposure indicator with a respirator, the battery 68 is connected to the circuit only when the exposure indicating apparatus 40, 40', 52 is correctly interfaced with the respirator, giving a long shelf life (10 years) for the battery 68 and exposure indicator circuitry.

The four basic stages of the processing device circuitry shown in FIGS. 14 and 15, identified as the input-bias circuit 132, differential amplifier 134, threshold detector 136, and timer/alarm driver 138, directly correspond to the stages as shown in FIG. 13. The components and their values in any one stage are not independent of the component values or performance of the other stages, but for simplicity, the circuit operation shall be described in terms of these divisions. However, such division and specificity of components and values shall not be taken as limiting the present invention as described in the accompanying claims.

The function of each stage shall now be described in further detail with reference to FIGS. 14 and 15. The input/bias circuit 132, is connected to sensor 60, preferably an electrochemical sensor. Although the following description describes this circuit with reference to an electrochemical sensor for simplicity purposes, as previously discussed, any type of sensing means can be utilized with a corresponding change to the circuitry of processing device 66. The input/bias circuit 132 maintains a bias potential across the working and counter electrodes of the electrochemical sensor, it provides a reference signal to cancel out the bias voltage upon input of those signals to the differential amplifier 134, it provides the means to vary the baseline signal from the differential amplifier 134, and it converts the sensor current to a millivolt signal applied to an input of the operational amplifier 144 of the differential amplifier 134.

Resistors R1 and R4 act as a voltage divider to provide a volt bias voltage $V_{bias}$ of the sensor counter electrode relative to the working electrode, $V_{bias}=(V^+)[R4/(R1+R4)]$. The electrochemical current through R4 develops the input voltage signal $V_2$ to the noninverting input of the operational amplifier 144. Resistors R2 and R3 provide a reference voltage $V_1$ to the inverting input of the operational amplifier 144, such that varying R3 allows the offset level of amplifier output $V_o$, to be selected for a particular sensor sensitivity and baseline current level. These criteria set the ratios of R4/R1 and R3/R2.

For both linearity of the gain of amplifier 144 and its optimization, the current through R3 coming from the inverting node through R5 should be negligible compared to that from R2. The current from the inverting node is determined by the amplifier output voltage as $V_o$/R6, and may be over 50 nA at alarm threshold. The reference current through R2 should thus be at least on the order of microamps.

The parallel combination of R2+R3 and R1+R4 determines the overall current drain by the input/bias circuit, and is to be kept as small as practical with the above constraints. Since the noninverting input impedance, (R7+R8), is much larger than the inverting input impedance, (R5), the current through R5 from the inverting node will be much larger than the current through R7 to the noninverting input. Hence, R1+R4 can be much larger than R2+R3, and the latter primarily determines the overall current drain. The upper limit of R4 is determined by the largest value, for the most current-to-voltage conversion, which will not limit the sensor current and allow it to remain in an amperometric mode. R4 being at approximately 200 K Ohms has been determined as a satisfactory upper limit for the preferred electrochemical sensor. For the R1–R4 values shown in FIG. 14, the sensor bias is 0.25 V, the reference current is 13.8 μA and the bias current 1.7 μA. These values meet the above criteria without excessive current drain and provide a highly uniform gain from the amplifier 144.

The primary effect of changes in the battery supply voltage $V^+$ due to temperature and time is on the input/bias circuit 132. The other three stages, based on commercial integrated circuits, are insensitive to small variations in $V^+$. The first effect on the input/bias circuit 132 is that the bias voltage $V_{bias}$ changes. Functionally, $V_{bias}=[R4/(R1+R4)]V^+$. Between upper and lower limits of $3.4<V^+<3.6$ volts, the bias voltage changes from 0.252 to 0.238 volts. Due to the extreme flatness of the discharge curve of the Lithium thionyl chloride battery, $V^+$ should remain above 3.55 volts for approximately 7,500 hours (310 days) during which the change in $V_{bias}$ would be less than 5 mV.

The second consequence of a change in $V^+$ is that the offset value of the output of the differential amplifier 134 also changes, causing the amount of sensor current required to reach the trigger point of the threshold detector 136 to change. It is desirable to have the amount of this change as close to zero as possible so the ppm target species concentration at threshold is constant. The sensor signal in millivolts at threshold $V_x^{th}$ is given by, $$V_x^{th}(\mathrm{mV}) = \frac{R5}{R6}\ 1.3 - \left[\frac{R4}{R1+R4} - \frac{R3}{R2+R3}\right] V^+ - V_{io}$$

where $V_{io}$ is the input offset voltage of the operational amplifier 144 and the value 1.3 is the internal reference voltage of the ICL7665S threshold detector chip 146 available from Harris Semiconductor. The variability from chip to chip of this reference voltage is only 1.300±0.025 volts for the ICL7665SA version. To reduce the effect of changes in $V^+$, the value in the brackets must be reduced relative to the amplifier gain, R5/R6=R7/R8. In addition, both the sensor and R4 may have variations with temperature that may affect the circuit. These variations may be compensated by using a thermistor in series with either R3 or R4, if necessary.

The differential amplifier 134 of FIG. 14 includes a TLC251BC, very low power, programmable silicon gate LinCMOS™ operational amplifier 144 specifically designed to operate from low voltage batteries. In the circuit of FIG. 14 with component values in Table 2, the operational amplifier 144 draws only 6.85 μA supply current at 3.6 volts. It has internal electrostatic discharge protection and is available in different grades rated to have maximum input offset voltages from 10 mV down to 2 mV at 25° C. It is available in chip form for surface mounting from Texas Instruments or its equivalent from Harris Semiconductor.

With a single stage amplifier being used, the gain of the amplifier must be large enough to trigger the threshold detector 136 at its fixed 1.30 Volt input level when the sensor signal from R4 exceeds the threshold set by R3. The output voltage $V_o$ from the operational amplifier is given by:

$$V_O = \left(\frac{R5+R6}{R7+R8}\right)\frac{R8}{R5}\ V_2 - \frac{R6}{R5}\ V_1$$

where $V_2$ is the input at the noninverting input, and $V_1$ the input at the inverting terminal. The parallel combination of R5 and R6 should equal R7 and R8 to minimize offset errors due to input currents. The gain is thus determined by the ratio of R6/R5 or R8/R7. To provide several tenths of a volt change in $V_o$ from a 1.5 mV input due to sensor current through R4, a gain of>150 is desired. The value of R6 must be kept as large as practical to minimize current through R5 and keep the reference current as low as possible, for reasons discussed above with respect to the input/bias circuit. Resistor R6=20MΩ is a realistic value with the values of R5 and R7 to follow for an ideal gain of 200. The gain of the differential amplifier 134 providing the amplified sensor signal to the threshold detector 136 is substantially linear.

The threshold detector 136 includes an ICL7665S CMOS micropower over/under voltage detector 146, available from Harris Semiconductor, to provide an extremely sharp transition from alarm-off to alarm-on when the threshold, target species concentration level, such as for example $H_2S$, sensed by the electrochemical sensor 60 is exceeded. It also provides various switching means of other circuit components to either ground or $V^+$ for operating multiple alarms and changing the LED flash frequency. In addition, it provides for detection of a low battery voltage condition and it requires only 2.5 μA supply current in the circuit of FIG. 14.

Figure 17:
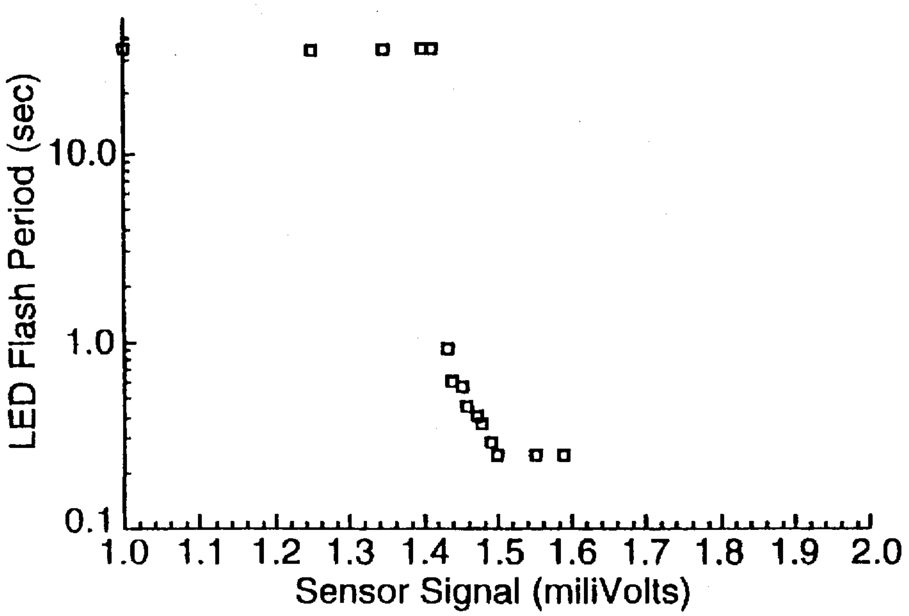
FIG. 17 is a graph showing an alarm signal protocol utilizing the circuit of FIG. 14.

When $V_o$ from the differential amplifier 134 exceeds the 1.30 volt internal reference voltage of the voltage detector 146, the HYST 1 terminal connects R9 to $V^+$. This puts R9 in parallel with R14, the timing resistor of the timer/alarm driver 138. Since R9 is much smaller than R14, the parallel resistance is ~R9 and the flash frequency switches abruptly from 1.90/($C_1$×R14) to 1.48/($C_1$×R9), where $C_1$ is the capacitance in farads and R in ohms. With the component values in Table 2, the flash frequency changes from one flash every about 34 seconds in the ready "OK" state, to one flash every 0.245 seconds in the alarm state. FIG. 17 shows the abruptness of the transition, the major portion of which occurs over an input range of 0.01 mV, corresponding to ~0.03 ppm range in $H_2S$ concentration for a nominal sensor sensitivity of 15 nA/10ppm and R4=200KΩ. The flash period changes from 0.9 see to 0.245 seconds over an additional 0.07 mV change. The abrupt frequency change of the LED alarm as shown in FIG. 17 occurs as the sensor signal crosses a threshold value of 1.43 mV.

Figure 18:
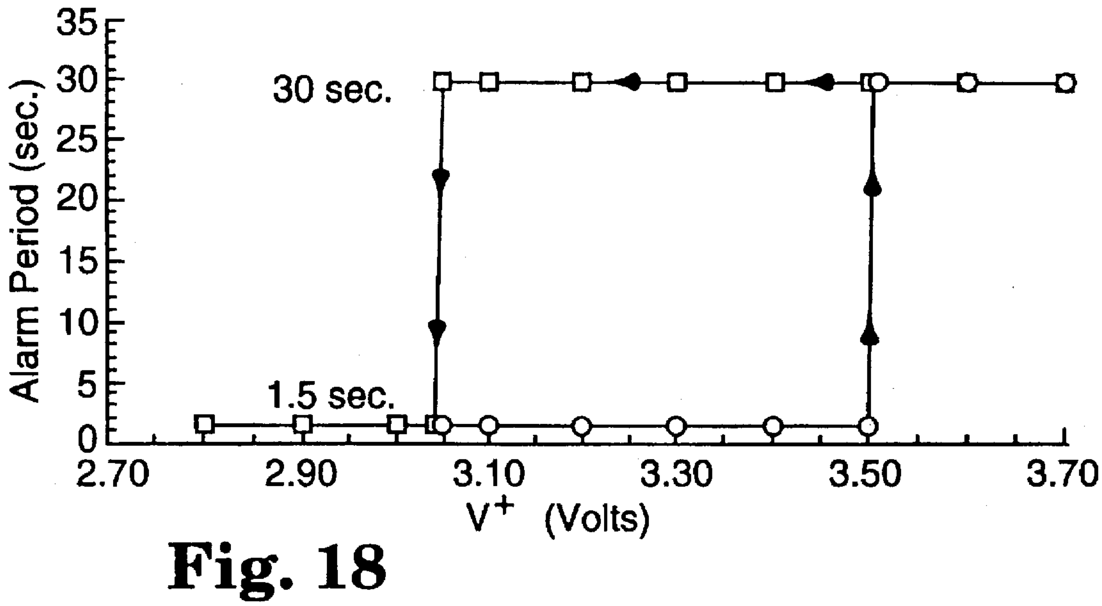
FIG. 18 is a graph showing low battery hysteresis threshold detection utilizing the circuit of FIG. 14.

A second function of the threshold detector 136 is to sense a low battery condition. The low voltage $V^+$ level is determined when [R10/(R10+R11)]$V^+$=1.3 volts is applied to terminal Set-2 of the voltage detector 146. With 1.3 volts applied, the Out-2 terminal is grounded, connecting the control terminal of an ICM7555 timer 148 to ground. The ICM7555 is available from Intersil. This causes the alarm frequency to increase from the once every about 30 seconds to once every 1.50 seconds for the component values as shown in Table 2, signaling a low battery warning or fault state. Because the battery voltage would in reality fluctuate about the cross-over value when crossing it, hysteresis is needed to prevent the fault state from appearing erratic. This is provided by the Hysteresis-2 terminal of the voltage detector 146 which, originally at $V^+$ potential, disconnects when the voltage at Set-2 terminal is 1.3 volts and puts R12 in series with R10 and R11 thereby decreasing the voltage applied to the Set-2 terminal of the voltage detector 146. This means that once triggered, the low battery indication or fault state will not go off until $V^+$ exceeds the value required to make [R10/(R10+R11+R12)]$V^+$=1.3 volts. This effect, for example, is shown in FIG. 18, which shows how the circuit of FIG. 14 responds as $V^+$ is first decreased, then increased through the set points. For the values of R10–R12 in Table 2, the $V^+_{low}$ value is 3.0 volts and the $V^+_{hi}$ value is 3.5 volts when the alarm is not flashing. During a square wave pulse of the indicators 42 (LEDs), the battery voltage drops in square wave form by an amount depending on the battery internal resistance and the current drawn by the LEDs. For the Tadiran™ TL-5902 battery and the LED current levels specified by R15 and R16 in FIG. 14, a 0.04 volt drop in $V^+$ occurs during a 15 msec alarm event consisting of two LEDs and a piezoelectric buzzer (FIG. 15).

The timer/alarm driver 138 of FIG. 14 includes an ICM7555, or equivalent, general purpose timer 148. The ICM7555 is a CMOS, low power version of the widely used NE555 timer chip. The timer 148 is used here in an astable multivibrator mode to drive LED or piezoelectric audible alarms. Although low power, it draws 68.0 μA. During an alarm event, the current required by the timer/alarm driver rises to over 13.6 mA in a square wave pulse through the LEDs. A lower power version of this circuit will improve the battery lifetime significantly.

The alarm frequencies f are determined simply by the value of R14 and $C_1$, (f~1/$C_1$(R14)), and the voltage applied to the control terminal of the timer 148. In the alarm and ready "OK" states, the alarm event length or pulse width of the flash, τ, is given by $C_1$(R13)/1.4. If the LED flash is too short, the eye can not perceive the full intensity. If it is too long, supply current is needlessly wasted. Flashes below about 6 to 7 milliseconds in length appear dim. A pulse length of about 15 msec long seems adequate for full perception. This also applies to a piezoelectric audible alarm operating at frequencies of ~5 KHz. A 6 msec pulse contains only about 20 cycles and sounds weaker than say a 15 msec pulse even though the amplitude is constant. For these reasons, R13 has been chosen in Table 2 to give an alarm pulse width of 15 msec. Clearly, R9, R14 and R13 can be varied to accommodate different C values. In the preferred embodiment, the indicator operates at a signaling rate in the frequency range of 0.001 to 30 Hz.

In FIG. 14, the LED pulse current is limited by resistors R15 or R16. The LEDs shown produce 2.5 milliCandella into a 90° viewing angle at a current of 10 mA. Under normal room lighting conditions, the output at 5–6 mA appears very adequate. In certain embodiments, the LEDs can be oriented to optimize the light entering the eye of the respirator wearer. The values of R15 and R16 in Table 2 were chosen to give a value of 6.8 mA for the specific LEDs used. The maximum output current of the ICM7555 is about 100 mA and is satisfactory for alarm embodiments anticipated.

For the fault state, the pulse width is also determined by the control voltage applied to the timer 148 and the actual value of $V^+$. As $V^+$ decreases the pulse width shortens, but it is generally longer than the alarm pulse width.

Figure 19:
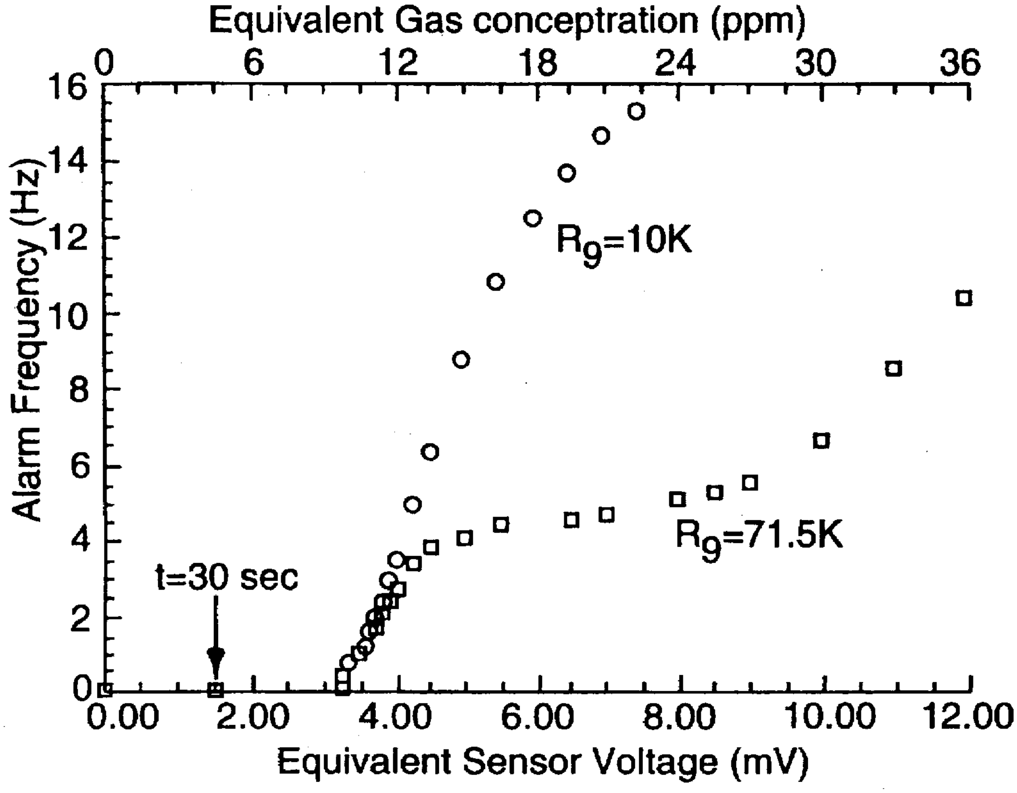
FIG. 19 is a graph showing alarm frequency rate variation as a function of target species concentration for the processing device of FIG. 15 utilizing two different values of R9.

FIG. 15 shows an alternate processing device circuit that is similar to that in FIG. 14 except that a junction field effect transistor 150 is added in series with resistor R9 and two alternate positions for connection of a piezo buzzer or audible alarm 152 are shown. FIG. 19, for example, shows the flash frequency of an LED alarm as a function of the sensor output(mV) for the circuit of FIG. 15 and the component values in Table 2. The equivalent target species concentration values assume a sensor sensitivity of 0.3 mV per ppm for hydrogen sulfide and an offset adjustment to make the threshold occur at about 10 ppm (achieved by adjusting R3). As shown by FIG. 19, the flash frequency remained low at about one flash every 30 seconds, indicating a ready state, until the threshold was reached, and then the flash frequency increased regularly as the equivalent sensor voltage increased, demonstrating a signal providing enhanced information to the user. The rate of frequency increase with increased concentration or sensor output, i.e., the slope of the curves in FIG. 19, is controllable through variation of R9. As shown in FIG. 19, the rate of frequency increase is relatively faster for R9=10K as compared to R9=71.5K.

Two different alternate connection positions for the audible alarm 152 result in different audible alarm signaling. For the audible alarm 152 connected between the out terminal of the timer 148 and the HYST 2 terminal of the voltage detector 146, the audible alarm or buzzer chirps with the flashing of the LED or other visual alarm utilized only if the alarm threshold has been crossed. With the audible alarm 152 connected to the OUT terminal of the timer 148 and $V^+$, the audible alarm chirps each time the LED or other visual indicator flashes. Therefore, the threshold detector 136 and timer/alarm driver 138 can work together to cause the audible alarm 152 to chirp in phase with the LED only when the target species concentration threshold is exceeded, but remain silent at other times the LED is flashing or alternately the audible alarm 152 can sound each time the LED flashes. It should be readily apparent from the previous discussion that any sensory indicator or alarm can be utilized in conjunction with the alarm signaling protocol of the exposure indicator, including a vibro-tactile indicator.

For "small hand or pocket sized" exposure indicators utilizing the signaling protocols described above, with more room for larger batteries and multiple color LEDs and other audible alarms, minimal changes can be made to the alarm driver stage to further enhance information provided to the user, e.g. addition of a transistor on the output of timer 148 for a loud alarm.

For applications where it is not necessary to have the circuit continually appraise the user of its correct functioning by means of a periodic ready 'OK' flash, and a user activated switch is desired instead, the addition of a single push button switch in place of R14 is all that is necessary. In this event, since the timer 148 draws a significant amount of the overall 94 μA current, it is possible with this small variation to have the timer come on only when it is needed for an alarm flash by having the switch poles connect $V^+$ to the 148 timer, thus extending the battery life.

EXAMPLES

Example 1. A mockup of a respirator system was constructed incorporating a detachable alarm device as illustrated in FIG. 6. A flow-through housing was machined from plastic to fit between the sorbent cartridge and face mask of a 6000 Series respirator manufactured by the Minnesota Mining and Manufacturing Company, St. Paul, Minn. The thickness was about 0.4 inches. Bayonet-type attachment means were glued onto both faces of the flow-through housing to fit the existing attachment means on the cartridge and face mask. A box-like receptacle to receive the detachable alarm device was attached to the flow-through housing. Two metallic feedthrough pins were inserted capable of conducting an electrical signal from a sensor in the flow-through housing to the alarm device. An exposure indicating apparatus was constructed of plastic to fit into the box-like receptacle, and connections were provided to receive the two metallic feed-through pins and conduct the sensor signal to a circuit in the exposure indicator for activating the alarm signal. An LED was mounted on each end of the exposure indicator so that one was always in a direct line of sight and readily observable to the respirator wearer, which served as the alert indicator.

Example 2. A mockup of a respirator system was constructed as in Example 1 except that there was no flow-through housing and the exposure indicator was demountably attached to a 6000 Series replaceable sorbent cartridge (Minnesota Mining and Manufacturing Company, St. Paul, Minn.) by means of an adapter similar to that illustrated in FIG. 7.

Example 3. A mockup of a respirator system was constructed incorporating an exposure indicator as illustrated in FIG. 5. A flow-through housing was machined from plastic to fit between the sorbent cartridge and the face mask of a 6000 Series respirator (Minnesota Mining and Manufacturing Co., St. Paul, Minn.). The thickness was about 0.4 inches. Bayonet-type attachment means were glued onto both faces of the flow-through housing to fit the existing attachment means on the cartridge and face mask. A box-like receptacle to receive the alarm device was attached to the flow-through housing. An exposure indicator was constructed of plastic to fit into the box-like receptacle, and a cone-shaped fluidly coupling tube on the exposure indicator inserted into an opening in the box-like receptacle to conduct gases from the flow-through housing to a sensor located in the exposure indicator. An LED was mounted on the exposure indicator in a direct line of sight and readily observable to the respirator wearer, which served as the alert indicator.

Example 4. A mockup of a respirator protection system was constructed as in Example 3 except that there was no flow-through housing and the exposure indicator was attached to a 6000 Series replaceable sorbent cartridge (Minnesota Mining and Manufacturing Company, St. Paul Minn.) by means of an adapter similar to that illustrated in FIG. 4.

Example 5. An electrochemical sensor, which was mounted in an exposure indicator connected to the exterior of a respirator cartridge by means of an adapter similar to that in FIG. 4, was used to monitor hydrogen sulfide in air. The sensor comprised a solid polymer electrolyte with nanostructured surface electrodes and was prepared as described in U.S. Pat. No. 5,338,430 entitled "Nanostructured Electrode Membranes," previously incorporated by reference.

A tapered plastic tube having a 1.5 mm entrance aperture was inserted into a 6.5 mm hole in one end of an empty 6000 series respirator cartridge to (Minnesota Mining and Manufacturing Company, St. Paul, Minn.). The tube exterior made a tight fit with the hole in the cartridge wall. The tube extended 1.8 cm into the interior of the empty cartridge. The tube external to the cartridge body opened into a straight walled tube with a 1.1 cm. inner diameter, 1.5 cm. outer diameter, and 1.7 cm. length. The sensor was clamped to the external end of the straight walled tube using rubber o-rings to help seal and hold the sensor in place. The tapered tube diameter was sufficiently large that it did not act as a diffusion limiting barrier. This function was provided by a 4 mil thick, porous polypropylene film (Minnesota Mining and Manufacturing Company, St. Paul, Minn.), filled with a heavy mineral oil, which was placed immediately in front of the sensor working electrode. A flow rate of 10 liters per minute of 10% relative humidity, 22° C. air was maintained through the cartridge, with no detectable leakage or bulk air flow into the alarm device. Upon introduction of hydrogen sulfide at a concentration of 10 ppm to the flow stream, a 3 mV signal was measured across a 100,000 ohm resistor connected to the electrodes. The response was reversible upon removal of the hydrogen sulfide.

Example 6. For this example the same set-up as described in Example 5 was used except the cartridge was filled with 2 mm diameter glass beads to simulate flow through a packed bed configuration. With a flow rate of 10 liters per minute of 10% relative humidity, 22° C. air containing 10 ppm hydrogen sulfide, a 3 mV signal was detected across the 100,000 ohm sensor resistor. The response was reversible upon removal of the hydrogen sulfide.

The present invention has now been described with reference to several embodiments thereof. It will be apparent to those skilled in the art that many changes can be made in the embodiments described without departing from the scope of the invention. For example, the exposure indicator of the present invention may also be used to monitor the presence of adequate oxygen in a respirator, in environmental air, or for a variety of medical applications. The indicator may also be used to monitor ambient air in vehicles, rooms, or other locations. Thus, the scope of the present invention should not be limited to the structures described herein, but only by structures described by the language of the claims and the equivalents of those structures.

We claim:

1. An exposure indicating apparatus comprising:

at least one sensor having at least one property responsive to a concentration of a target species; and a processing device generating a concentration signal as a function of the at least one property, the processing device including a single signal indicator activated as a function of the concentration signal, the processing device further including driving means for continuously driving the indicator at one of a first signaling rate indicative of a readiness state of an exposure indicating apparatus operating within predefined design parameters, a second signaling rate discernible from the first signaling rate indicative of an exposure indicating apparatus operating outside of the predefined design parameters, a threshold exposure signaling rate indicative of the concentration attaining a predetermined threshold concentration, and a varying exposure signaling rate that varies as a function of the concentration signal after the predetermined threshold concentration is attained.

2. The apparatus according to claim 1, wherein the driving means drives the indicator at the varying exposure signaling rate which includes a plurality of exposure signaling rates corresponding to a plurality of predetermined threshold concentrations.

3. The apparatus according to claim 1, wherein the indicator comprises at least one of a visual indicator, an audible indicator, and a vibro-tactile indicator.

4. The apparatus according to claim 1, wherein the sensor is positioned in fluid communication with a flow-through path on a respirator.

5. The apparatus according to claim 1, wherein the exposure indicating apparatus is attached to a respirator.

6. The apparatus according to claim 1, wherein the exposure indicating apparatus is constructed for use as a personal exposure indicator.

7. The apparatus according to claim 1, wherein the exposure indicating apparatus is constructed for use as an environmental indicator.

8. The apparatus of claim 1 wherein the sensor has at least one property responsive to a concentration of a target species, the at least one property selected from the group consisting of temperature, mass, mechanical deformation, complex electric permittivity, gravimetric, optical absorption and reflectivity, magnetic permeability, resistivity, electrochemical, optical emission, electronic surface states, and bulk modulus of elasticity.

9. The apparatus of claim 1 wherein the at least one property is responsive to a concentration of a target species selected from the group consisting of hydrogen sulfide, carbon monoxide, other toxic gases and vapors, organic gases and vapors, oxygen, and explosive gases and vapors.

10. The apparatus according to claim 1, wherein the sensor comprises a reversible sensor.

11. The apparatus according to claim 1, wherein the exposure signaling rate is within the frequency range of about 0.001 Hz to 30 Hz.

12. The apparatus according to claim 1 further comprising:

a flow-through housing containing the sensor forming a portion of a flow-through path between an external environment and a face mask; and receiving means on the flow-through housing for releasable engagement with the processing device.

13. The apparatus according to claim 12 further including signal transmission means for connecting the sensor with the exposure indicating apparatus, the receiving means permitting the exposure indicating apparatus to be removed from the housing without permitting the entry of ambient air.

14. The apparatus according to claim 1, wherein the processing device includes:

an over/under threshold detector device for receiving the concentration signal and a battery signal and for generating an output representative of one of a predetermined threshold concentration being exceeded, the battery signal falling below a predetermined battery level, and the exposure indicating apparatus operating within predefined parameters; and a timer device connected to the over/under threshold detector for driving the indicator in response to the output of the over/under threshold detector.

15. The apparatus according to claim 1, wherein the means for driving the indicator at the varying exposure signaling rate includes means for driving the indicator at a rate that varies as a continuous function of the concentration signal.

16. A method for an exposure indicating apparatus for indicating exposure of a user to a target species, comprising the steps of:

sensing a concentration of the target species;

generating a concentration signal as a function of the concentration;

contiguously activating a single signal indicator at one of a first signaling rate indicative of the exposure indicating apparatus operating within predefined design parameters, a second signaling rate discernible from the first signaling rate indicative of an exposure indicating apparatus operating outside of the predefined design parameters, a threshold exposure signaling rate indicative of the concentration attaining a predetermined threshold concentration, and a varying exposure signaling rate which varies as a function of the concentration signal after the predetermined threshold has been attained.

17. The method according to claim 16, wherein after the predetermined threshold concentration is attained, the indicator is driven at an exposure signaling rate which varies as a continuous function of the concentration signal.

18. The method according to claim 16, wherein after the predetermined threshold concentration is attained, the indicator is driven at a plurality of exposure signaling rates corresponding to a plurality of predetermined threshold concentrations.

19. An exposure indicating apparatus comprising:

at least one sensor having at least one property responsive to a concentration of a target species; and a processing device generating a concentration signal as a function of the at least one property, the processing device including:

a single signal indicator activated as a function of the concentration signal; and driving means for continuously driving the indicator at one of a ready signaling rate indicative of an exposure indicating apparatus operating within predefined design parameters, a threshold exposure signaling rate indicative of the concentration attaining a predetermined threshold concentration, and a varying exposure signaling rate which varies as a function of the concentration signal after the predetermined threshold concentration is attained.

* * * * *

UNITED STATES PATENT AND TRADEMARK OFFICE

CERTIFICATE OF CORRECTION

PATENT NO. : 5,666,949
DATED : September 16, 1997
INVENTOR(S) : Mark K. Debe, Lowell R. Miller, Edward E. Parsonage, Richard J. Poirier and Gregory Yuschak It is certified that error appears in the above-identified patent and that said Letters Patent is hereby corrected as shown below:

On Title Page, under "References Cited" add the following references:

| | | | |
|---|---|---|---|
| 2,741,912 | 04/1956 | Schultze | 116/200 |
| 3,252,458 | 05/1966 | Krasberg | 128/202.22 |
| 3,250,873 | 05/1966 | Kudlaty et al | 116/200 |
| 3,966,440 | 06/1976 | Roberts | 128/202.22 |
| 4,205,043 | 05/1980 | Each et al | 128/202.22 |
| 4,231,249 | 11/1980 | Zuckerman | 73/23 |
| 4,340,885 | 07/1982 | Chavis et al | 340/632 |
| 4,488,118 | 12/1984 | Jeffers et al | 324/455 |
| 4,800,373 | 01/1989 | Mayz | 128/202.22 |
| 5,214,412 | 05/1993 | Gavlak et al | 340/632 |

Column 7,
Line 19: Delete the word "polyarnides" and insert in place thereof -- polyamides --.

Column 10,
Line 19: Delete the word "at." and insert in place thereof -- al. --.

Column 17,
Line 2: Delete "$V_x^{th}$" amd insert in place thereof -- $V_s^{th}$ --.

Column 18,
Line 12: Delete the word "see" and insert in place thereof -- sec --.

UNITED STATES PATENT AND TRADEMARK OFFICE

CERTIFICATE OF CORRECTION

PATENT NO. : 5,666,949

DATED : September 16, 1997

INVENTOR(S) : Mark K. Debe, Lowell R. Miller, Edward E. Parsonage, Richard J. Poirier and Gregory Yuschak It is certified that error appears in the above-identified patent and that said Letters Patent is hereby corrected as shown below:

Claim 16, Column 23,
Line 21: Delete the word "contiguously" and insert in place thereof -- continuously --.

Signed and Sealed this

Twenty-first Day of August, 2001

*Attest:*

Nicholas P. Godici

NICHOLAS P. GODICI

*Attesting Officer*

*Acting Director of the United States Patent and Trademark Office*